US009424565B2

(12) United States Patent
Kortemeyer et al.

(10) Patent No.: US 9,424,565 B2
(45) Date of Patent: Aug. 23, 2016

(54) SYSTEM AND METHOD FOR PREPARING AND DELIVERING INFORMATIONAL CONTENT

(71) Applicant: Board of Trustees of Michigan State University, East Lansing, MI (US)

(72) Inventors: Gerd Kortemeyer, East Lansing, MI (US); Wolfgang Bauer, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 420 days.

(21) Appl. No.: 13/775,862

(22) Filed: Feb. 25, 2013

(65) Prior Publication Data

US 2013/0166758 A1    Jun. 27, 2013

Related U.S. Application Data

(62) Division of application No. 10/130,864, filed as application No. PCT/US00/24943 on Sep. 12, 2000, now Pat. No. 8,504,482.

(60) Provisional application No. 60/167,887, filed on Nov. 26, 1999.

(51) Int. Cl.
*G06Q 10/00* (2012.01)
*G06Q 20/12* (2012.01)
*G09B 7/00* (2006.01)

(52) U.S. Cl.
CPC .............. *G06Q 20/1235* (2013.01); *G09B 7/00* (2013.01)

(58) Field of Classification Search
USPC .......................................................... 705/54
See application file for complete search history.

(56) References Cited

U.S. PATENT DOCUMENTS

| 5,377,258 | A |   | 12/1994 | Bro |
| 5,629,980 | A | * | 5/1997 | Stefik et al. ...................... 705/54 |
| 5,892,900 | A | * | 4/1999 | Ginter ..................... G06F 21/10 726/26 |
| 5,933,827 | A |   | 8/1999 | Cole et al. |

OTHER PUBLICATIONS

E. Kashy, et al., "Capa, An Integrated Computer Assisted Personalized Assignment System", Am. J. Phys. 61 (12), 1993, pp. 1124-1130.

E. Kashy, et al., "Conceptual Questions in Computer-Assisted Assignments", Am. J. Phys. 63 (11), 1995, pp. 1000-1005.

(Continued)

*Primary Examiner* — Zeshan Qayyum
(74) *Attorney, Agent, or Firm* — Harness, Dickey & Pierce, P.L.C.

(57) ABSTRACT

At least one content publishing server having a memory storing a map data structure configured by a content author which defines relationships among plural resources and thereby define an informational item of higher granularity content. Each of the plural resources are associated with a first electronic file linked to said map data structure and configured to store information about the usage of the associated resource. Higher granularity content is associated with a second electronic file linked to said map data structure configured to store information about the usage of the higher granularity content. The server which delivers the informational item to a computer gathers feedback usage information reflecting how the higher granularity content and individual ones of the plural resources are used by users. The server updates the electronic files in accordance with the feedback usage information.

20 Claims, 21 Drawing Sheets

Overview of Network

(56) References Cited

OTHER PUBLICATIONS

D.J. Morrissey, et al., "Using Computer-Assisted Personalized Assignments for Freshman Chemistry", Journal of Chemical Education, vol. 72, 1995, pp. 141-146.

M. Thoennessen, et al., "Computer-Assisted Assignments in a Large Physics Class", Computers Educ. 27, 141 (1996), 9 pages.

E. Kashy, et al., "Using Networked Tools to Enhance Student Success Rates in Large Classes", ASEE/IEEE Frontiers in Education Conference, Nov. 5-8, 1997, 5 pages.

M. Thoennessen, et al., "Application of Technology and Asynchronous Learning Networks in Large Lecture Classes", IEEE, Computer Society Press, 1997, 9 pages.

E. Kashy, et al., "Using Networked Tools to Promote Student Success in Large Classes", Journal of Engineering Education 87, 385 (1998), 7 pages.

G. Kortemeyer, et al., "Multimedia Collaborative Content Creation (mc3)—the MSU LectureOnline System", Jan. 25, 1999, 6 pages.

M. Thoennessen, et al., "Impact of Asynchronous Learning Networks in Large Lecture Classes", Journal of Group Decision and Negotiations 8, 371 (1999), 12 pages.

N.N. Artus, et al., "A Computer-Assisted Personalized Approach in an Undergraduate Physiology Class", Journal of Plant Physiology, vol. 119 (1999), pp. 1177-1186.

M. Thoennessen, et al., "Response to Student Attacks on On-Campus ALNs", 1999, 25 pages.

\* cited by examiner

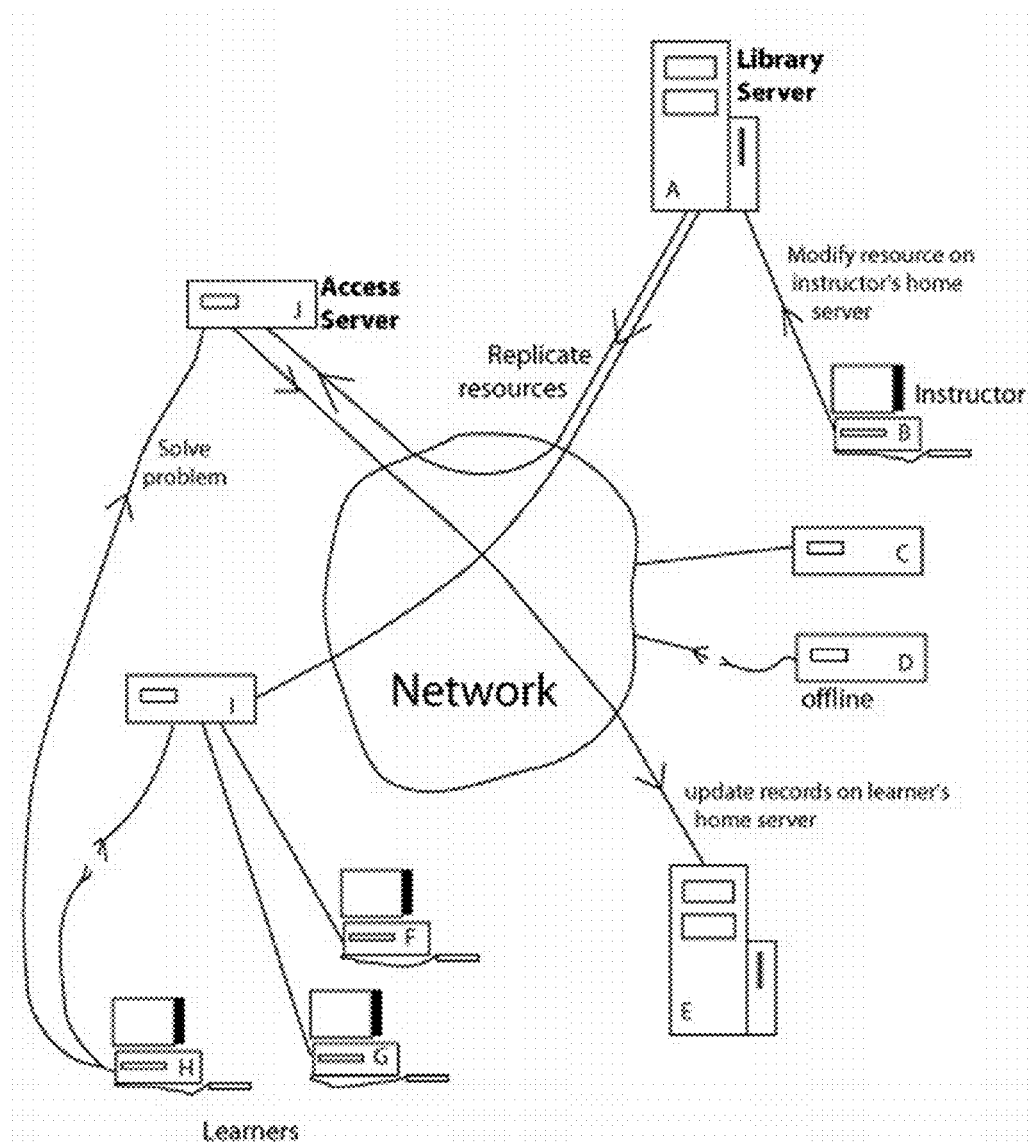
Fig. 1 – Overview of Network

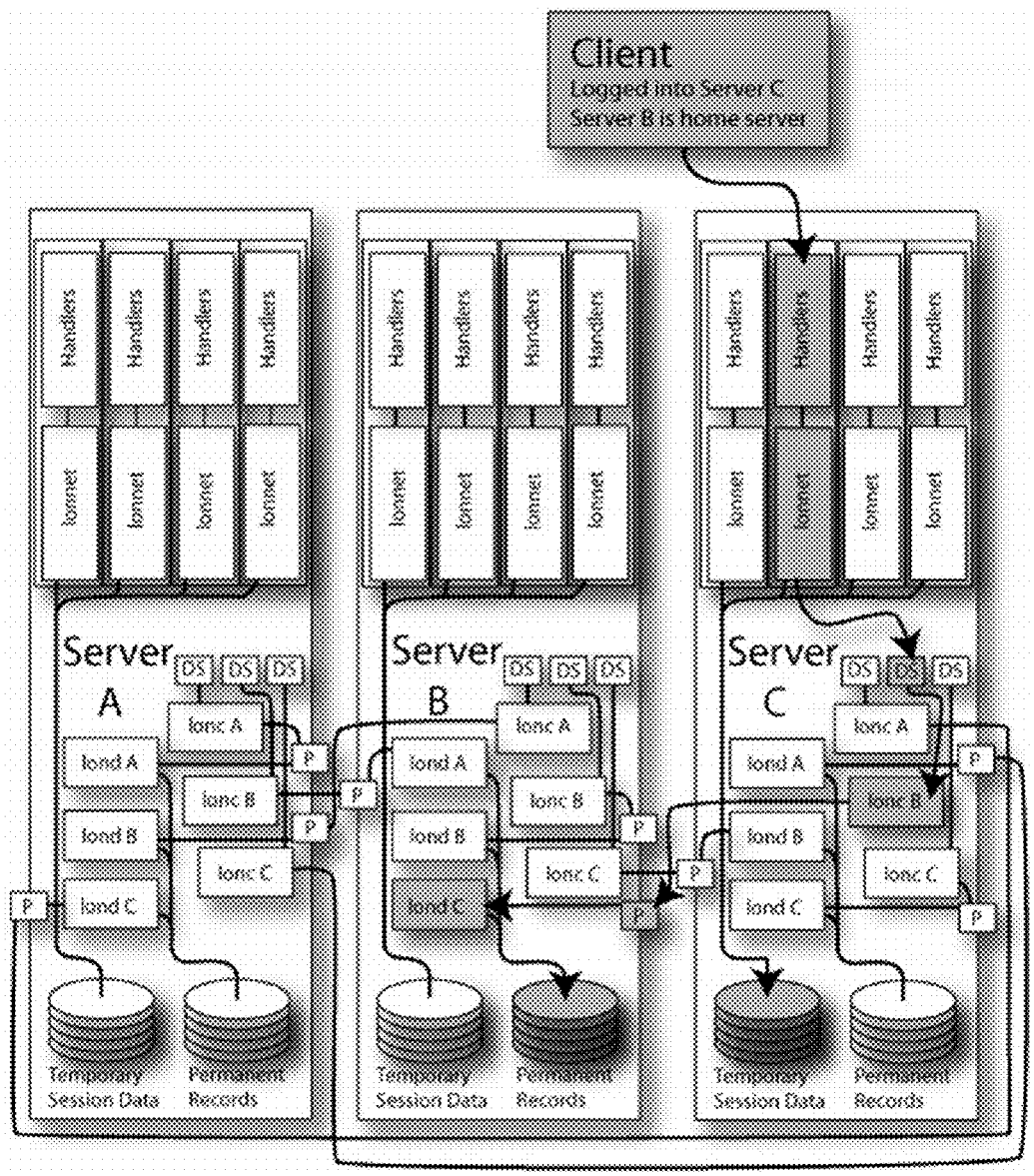
Fig. 2A – Overview of Network Communication

```
msul1:msu:library:zaphod.lite.msu.edu:35.8.63.51
msua1:msu:access:agrajag.lite.msu.edu:35.8.63.68
msul2:msu:library:frootmig.lite.msu.edu:35.8.63.69
msua2:msu:access:bistromath.lite.msu.edu:35.8.63.67
hubl14:hub:library:hubs128-pc-14.cl.msu.edu:35.8.116.34
hubl15:hub:library:hubs128-pc-15.cl.msu.edu:35.8.116.35
hubl16:hub:library:hubs128-pc-16.cl.msu.edu:35.8.116.36
huba20:hub:access:hubs128-pc-20.cl.msu.edu:35.8.116.40
huba21:hub:access:hubs128-pc-21.cl.msu.edu:35.8.116.41
huba22:hub:access:hubs128-pc-22.cl.msu.edu:35.8.116.42
huba23:hub:access:hubs128-pc-23.cl.msu.edu:35.8.116.43
hubl25:other:library:hubs128-pc-25.cl.msu.edu:35.8.116.45
huba27:other:access:hubs128-pc-27.cl.msu.edu:35.8.116.47
```

Fig. 2B – Example of Hosts Lookup Table

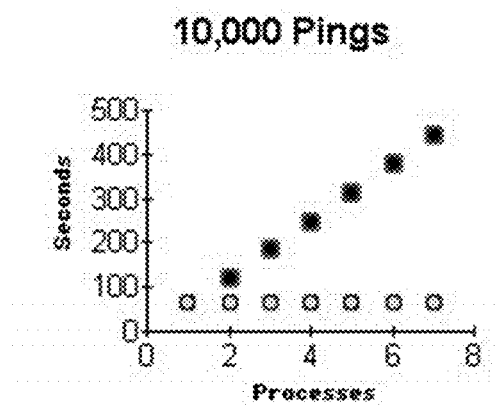

Fig. 2C – Benchmark on Parallelism of Server-Server Communication (no disk access)

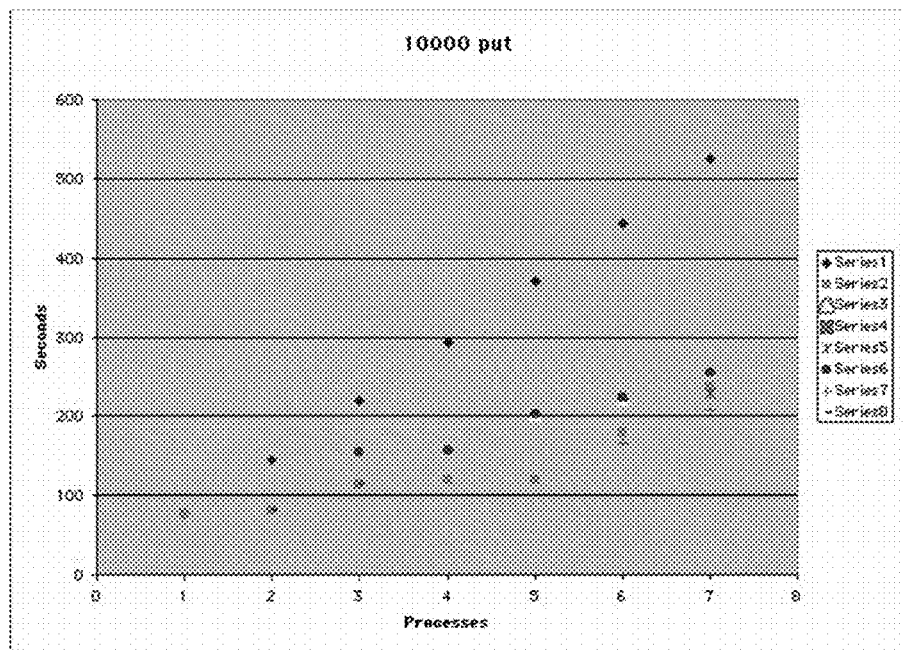
Fig. 2D – Benchmark on Parallelism of Server-Server Communication (with disk access as in Fig. 2A)

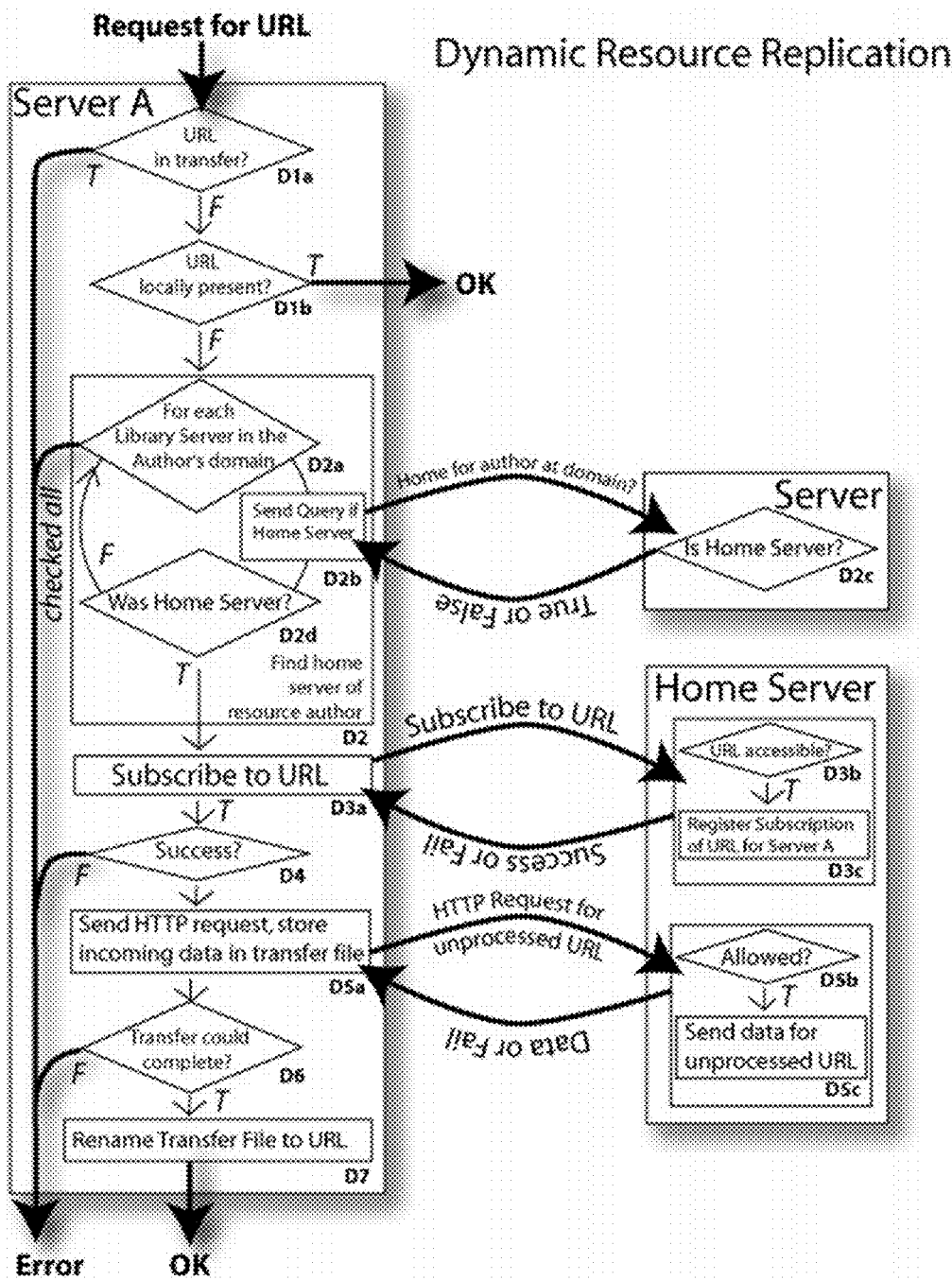
Fig. 3A – Dynamic Resource Replication, subscription

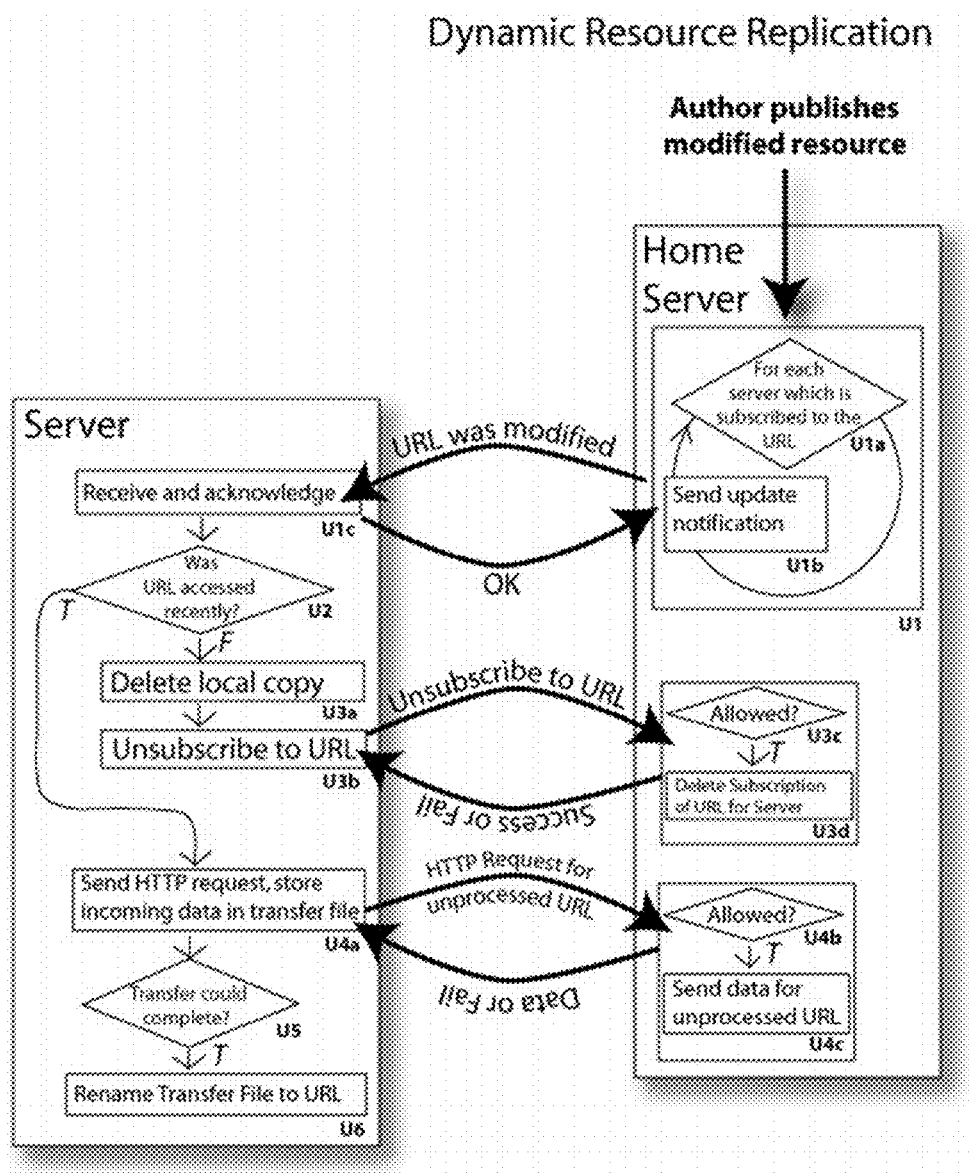
Fig. 3B – Dynamic Resource Replication, modification

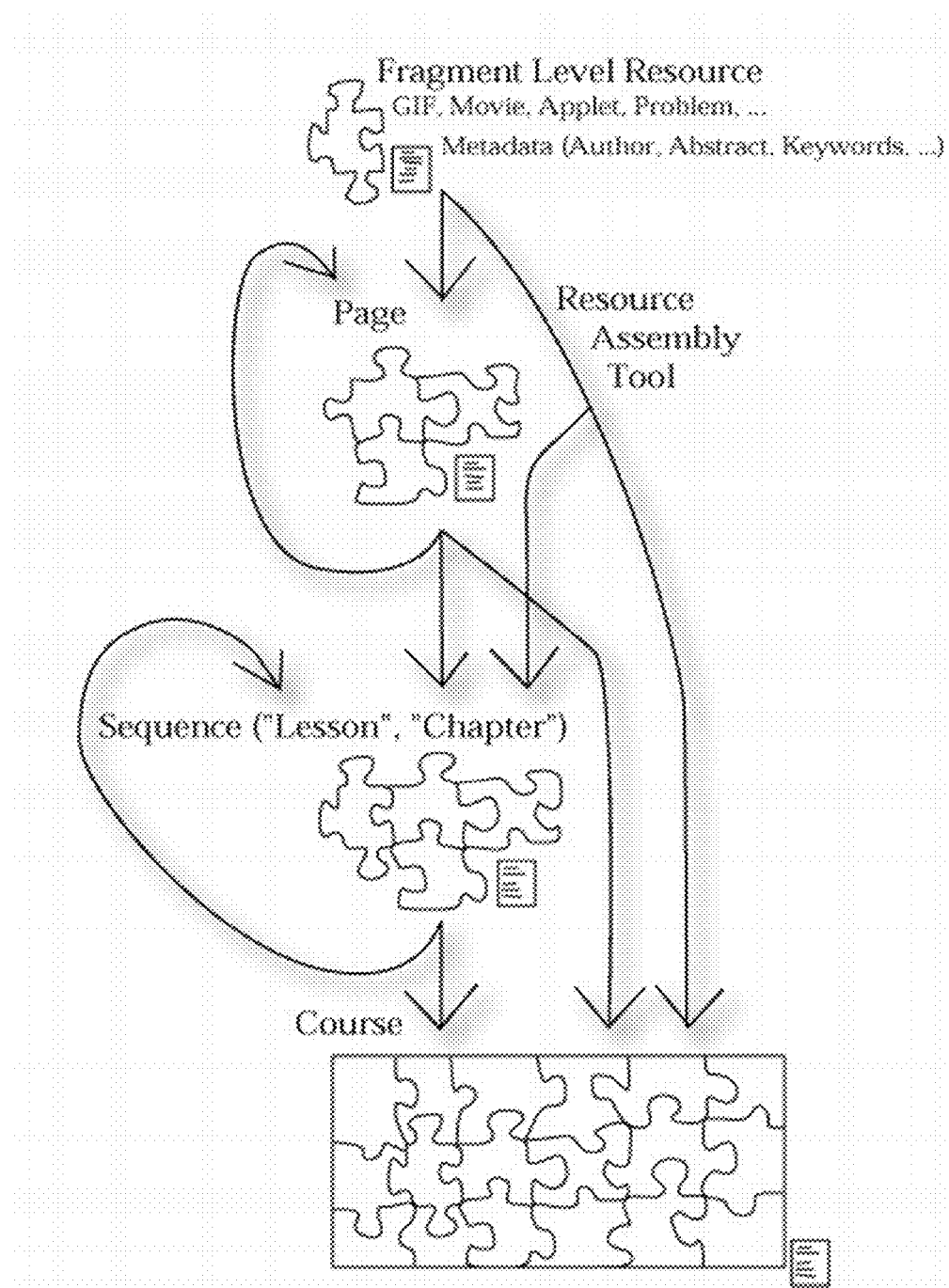
Fig. 4 – Illustration of Resource Assembly

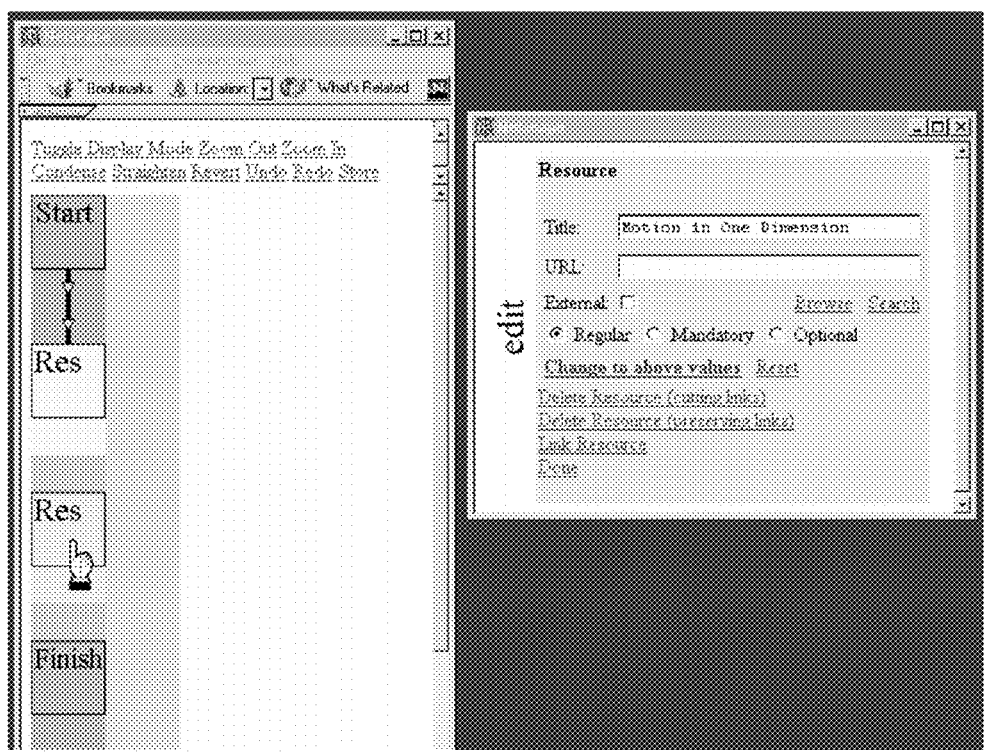
Fig. 5A – Example, Graphical User Interface of Resource Assembly Tool

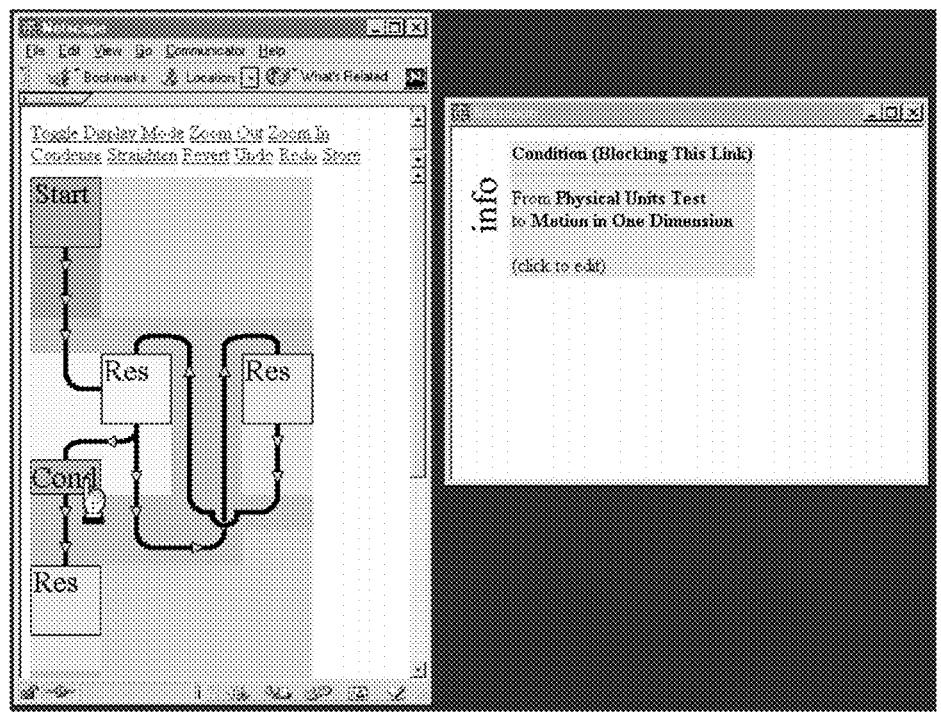
Fig. 5B – Example, Graphical User Interface of Resource Assembly Tool

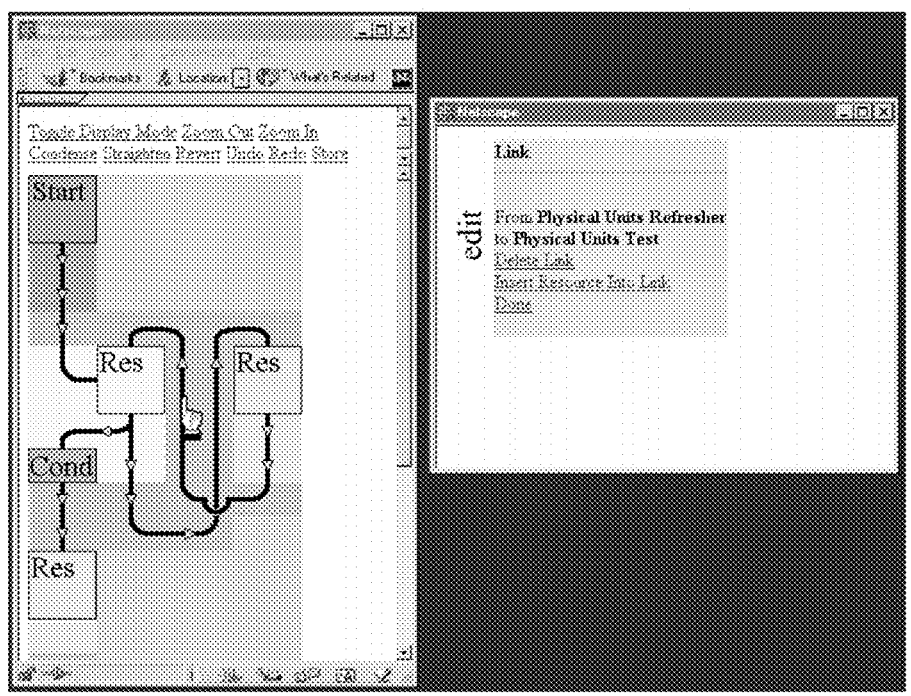
Fig. 5C – Example, Graphical User Interface of Resource Assembly Tool

```
<map>
<resource id="1"
          src="/res/msu/korte/phy231welcome.html"
          type="start"
          title="Start"></resource>
<resource id="2"
          src="" type="finish"
          title="Finish"></resource>
<resource id="6"
          src="/res/msu/korte/tests/units.problem"
          type="mandatory"
          title="Physical Units Test"></resource>
<resource id="9"
          src="/res/msu/korte/chapters/onedim.sequence"
          title="Motion in One Dimension"></resource>
<resource id="11"
          src="/res/msu/bauer/bridges/units.sequence"
          title="Physical Units Refresher"></resource>
<condition id="19"
          type="stop"
          value="user.assessments[this./res/msu/korte/tests/units.problem].status=solved">
  </condition>
<link from="1" to="6"></link>
<link from="6" to="9" condition="19"></link>
<link from="6" to="11"></link>
<link from="11" to="6"></link>
</map>
```

Fig. 6 – XML representation of the map in Fig. 5C (non-graphical information only).

```
<map>
<resource id="1" src="" type="start" title="Start"></resource>
<resource id="2" src="" type="finish" title="Finish"></resource>
<resource id="5" src="/res/msu/korte/tests/pretest.problem" type="mandatory"
    title="Pretest"></resource>
<resource id="9" src="/res/msu/korte/parts/part1.sequence" type="mandatory"
    title="Part 1"></resource>
<resource id="11" src="/res/msu/korte/tests/midterm.sequence" type="mandatory"
    title="Midterm"></resource>
<resource id="15" src="/res/msu/korte/parts/part2.sequence" type="mandatory"
    title="Part 2"></resource>
<condition id="19" type="stop"
    value="user.assessments[this./msu/korte/tests/pretest.problem].status=solved">
    </condition>
<resource id="20" src="/res/msu/korte/refresh/refresher.sequence"
    title="Refresher"></resource>
<resource id="29" src="/res/msu/korte/tests/final.sequence" type="mandatory"
    title="Final Exam"></resource>
<condition id="30" type="stop"
    value="user.assessments[this./msu/korte/tests/midterm.sequence].percent>60">
    </condition>
<resource id="36" src="/res/msu/korte/refresh/review.sequence"
    title="Review"></resource>
<condition id="43" type="force"
    value="user.assessments[this./msu/korte/tests/midterm.sequence].percent<10">
    </condition>
<resource id="58" src="/res/msu/korte/chapters/applications.sequence" type="optional"
    title="Applications"></resource>
<condition id="70" type="stop"
    value="user.assessments[this./msu/korte/tests/final.sequence].percent>60">
    </condition>
<link from="1" to="5"></link>
<link from="9" to="11"></link>
<link from="11" to="15" condition="30"></link>
<link from="5" to="9" condition="19"></link>
<link from="5" to="20"></link>
<link from="20" to="9"></link>
<link from="11" to="36" condition="43"></link>
<link from="36" to="9"></link>
<link from="36" to="11"></link>
<link from="15" to="29"></link>
<link from="29" to="2" condition="70"></link>
<link from="11" to="11"></link>
</map>
```

Fig. 7A – Example of a course map that has nested sequences

```
<map>
<resource id="1" src="" type="start" title="Start"></resource>
<resource id="2" src="" type="finish" title="Finish"></resource>
<resource id="5" src="/res/msu/korte/parts/part1intro.html"
    title="Part 1 Introduction"></resource>
<resource id="6" src="/res/msu/korte/parts/part1dir.xml" title="Directions"></resource>
<resource id="12" src="/res/msu/korte/tests/part11.problem" title="Problem 1"></resource>
<resource id="13" src="/res/msu/korte/tests/part13.problem" title="Problem 3"></resource>
<resource id="19" src="/res/msu/korte/tests/part12.problem" title="Problem 2"></resource>
<resource id="24" src="/res/msu/korte/parts/summary.page" title="Summary"></resource>
<condition id="47" type="stop"
    value="user.assessments[this./msu/korte/tests/part11.problem].status=solved">
    </condition>
<condition id="48" type="stop"
    value="user.assessments[this./msu/korte/tests/part12.problem].status=solved">
    </condition>
<condition id="49" type="stop"
    value="user.assessments[this./msu/korte/tests/part13.problem].status=solved">
    </condition>
<link from="5" to="6"></link>
<link from="1" to="5"></link>
<link from="6" to="12"></link>
<link from="6" to="13"></link>
<link from="6" to="19"></link>
<link from="12" to="24" condition="47"></link>
<link from="19" to="24" condition="48"></link>
<link from="13" to="24" condition="49"></link>
<link from="24" to="2"></link>
</map>
```

Fig. 7B – Example of a sequence (`part1.sequence`) that has nested pages

```
<map>
<resource id="1" src="" type="start" title="Start"></resource>
<resource id="2" src="" type="finish" title="Finish"></resource>
<resource id="5" src="/res/msu/smith/racecar.problem"></resource>
<resource id="6" src="/res/msu/smith/toofast.html"></resource>
<resource id="8" src="/res/msu/smith/tooslow.html"></resource>
<resource id="15" src="/res/msu/smith/accelerate.html"></resource>
<condition id="40" type="force"
    value="user.assessments[this./msu/smith/racecar.problem].status=solved"></condition>
<condition id="41" type="stop"
    value="user.assessments[this./msu/smith/racecar.problem].answer=friction"></condition>
<condition id="42" type="stop"
    value="user.assessments[this./msu/smith/racecar.problem].answer=sliding"></condition>
<condition id="43" type="stop"
value="user.assessments[this./msu/smith/racecar.problem].answer=nonconstant"></condition>
<link from="1" to="5"></link>
<link from="5" to="6" condition="41"></link>
<link from="5" to="8" condition="42"></link>
<link from="5" to="15" condition="43"></link>
<link from="6" to="2"></link>
<link from="8" to="2"></link>
<link from="15" to="2"></link>
<link from="5" to="2" condition="40"></link>
</map>
```

Fig. 7C – Example of a page (`summary.page`)

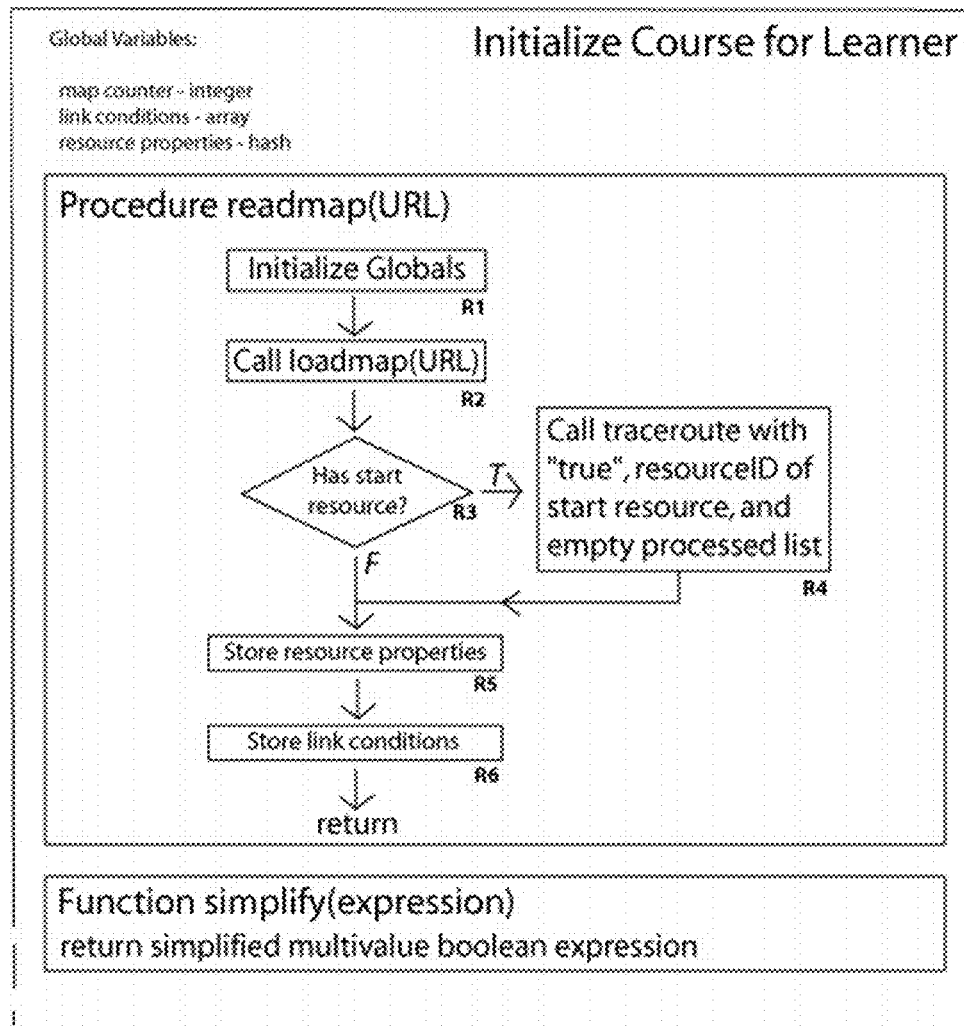
Fig. 8 – Flow chart of the course initialization routine run when a learner first accesses a course during a session (see Figs. 9A and 11A for the procedures `loadmap` and `traceroute`)

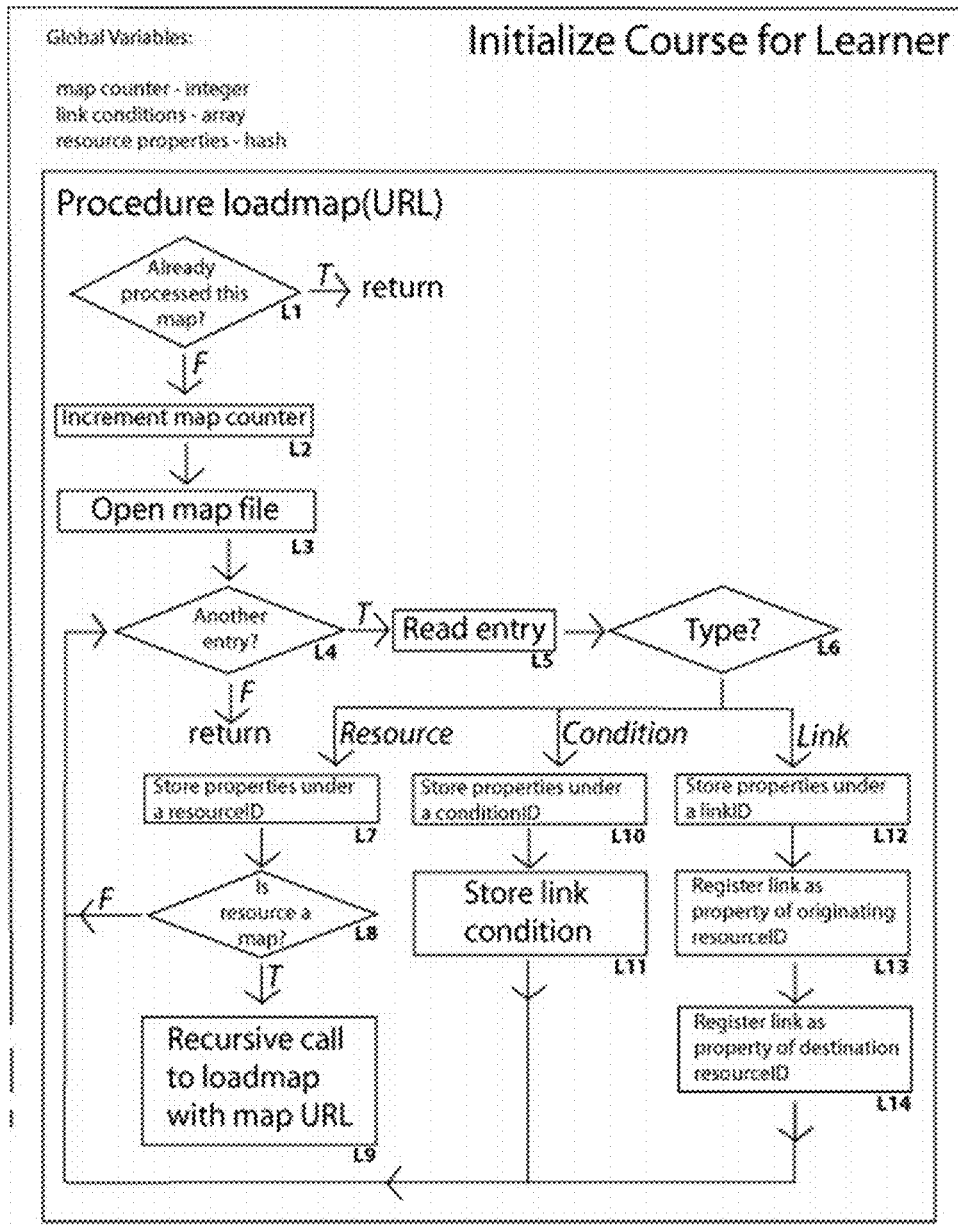
Fig. 9A – Flow chart of procedure `loadmap`

```
ids_/res/msu/korte/chapters/applications.sequence: 1.58
ids_/res/msu/korte/parts/part1.sequence: 1.9
ids_/res/msu/korte/parts/part1dir.xml: 2.6
ids_/res/msu/korte/parts/part1intro.html: 2.5
ids_/res/msu/korte/parts/part2.sequence: 1.15
ids_/res/msu/korte/parts/summary.page: 2.24
ids_/res/msu/korte/refresh/refresher.sequence: 1.20
ids_/res/msu/korte/refresh/review.sequence: 1.36
ids_/res/msu/korte/tests/final.sequence: 1.29
ids_/res/msu/korte/tests/midterm.sequence: 1.11
ids_/res/msu/korte/tests/part11.problem: 2.12
ids_/res/msu/korte/tests/part12.problem: 2.19
ids_/res/msu/korte/tests/part13.problem: 2.13
ids_/res/msu/korte/tests/pretest.problem: 1.5
ids_/res/msu/smith/accelerate.html: 3.15
ids_/res/msu/smith/racecar.problem: 3.5
ids_/res/msu/smith/toofast.html: 3.6
ids_/res/msu/smith/tooslow.html: 3.8

...

map_start_/res/msu/korte/foo.course: 1.1
map_start_/res/msu/korte/parts/part1.sequence: 2.1
map_start_/res/msu/korte/parts/summary.page: 3.1

...

map_finish_/res/msu/korte/foo.course: 1.2
map_finish_/res/msu/korte/parts/part1.sequence: 2.2
map_finish_/res/msu/korte/parts/summary.page: 3.2

...

title_1.11: Midterm
title_1.15: Part 2
title_1.20: Refresher
title_1.29: Final Exam
title_1.36: Review
title_1.5: Pretest
title_1.58: Applications
title_1.9: Part 1
title_2.12: Problem 1
title_2.13: Problem 3
title_2.19: Problem 2
title_2.24: Summary
title_2.5: Part 1 Introduction
title_2.6: Directions

...
```

Fig. 9B – Dump of the resource properties hash. Excerpt of the resource properties gathered in procedure `loadmap`

```
to_1.1: 1.1
to_1.11: 1.3,1.7,1.12
to_1.15: 1.10
to_1.20: 1.6
to_1.29: 1.11
to_1.36: 1.8,1.9
to_1.5: 1.4,1.5
to_1.9: 1.2
to_2.1: 2.2
to_2.12: 2.6
to_2.13: 2.8
to_2.19: 2.7
to_2.24: 2.9
to_2.5: 2.1
to_2.6: 2.3,2.4,2.5
to_3.1: 3.1
to_3.15: 3.7
to_3.5: 3.2,3.3,3.4,3.8
to_3.6: 3.5
to_3.8: 3.6

...
from_1.11: 1.2,1.9,1.12
from_1.15: 1.3
from_1.2: 1.11
from_1.20: 1.5
from_1.29: 1.10
from_1.36: 1.7
from_1.5: 1.1,1.6
from_1.9: 1.4,1.8
from_2.12: 2.3
from_2.13: 2.4
from_2.19: 2.5
from_2.2: 2.9
from_2.24: 2.6,2.7,2.8
from_2.5: 2.2
from_2.6: 2.1
from_3.15: 3.4
from_3.2: 3.5,3.6,3.7,3.8
from_3.5: 3.1
from_3.6: 3.2
from_3.8: 3.3

...
```

Fig. 9C – Dump of the resource properties hash. Excerpt of information gathered about links between resources in subroutine `loadmap`.

| goesto_1.1: 1.5 | comesfrom_1.1: 1.1 | undercond_1.1: 0 |
| --- | --- | --- |
| goesto_1.10: 1.29 | comesfrom_1.10: 1.15 | undercond_1.10: 0 |
| goesto_1.11: 1.2 | comesfrom_1.11: 1.29 | undercond_1.11: 1.70 |
| goesto_1.12: 1.11 | comesfrom_1.12: 1.11 | undercond_1.12: 0 |
| goesto_1.2: 1.11 | comesfrom_1.2: 1.9 | undercond_1.2: 0 |
| goesto_1.3: 1.15 | comesfrom_1.3: 1.11 | undercond_1.3: 1.30 |
| goesto_1.4: 1.9 | comesfrom_1.4: 1.5 | undercond_1.4: 1.19 |
| goesto_1.5: 1.20 | comesfrom_1.5: 1.5 | undercond_1.5: 0 |
| goesto_1.6: 1.5 | comesfrom_1.6: 1.20 | undercond_1.6: 0 |
| goesto_1.7: 1.36 | comesfrom_1.7: 1.11 | undercond_1.7: 1.43 |
| goesto_1.8: 1.9 | comesfrom_1.8: 1.36 | undercond_1.8: 0 |
| goesto_1.9: 1.11 | comesfrom_1.9: 1.36 | undercond_1.9: 0 |
| goesto_2.1: 2.6 | comesfrom_2.1: 2.5 | undercond_2.1: 0 |
| goesto_2.2: 2.5 | comesfrom_2.2: 2.1 | undercond_2.2: 0 |
| goesto_2.3: 2.12 | comesfrom_2.3: 2.6 | undercond_2.3: 0 |
| goesto_2.4: 2.13 | comesfrom_2.4: 2.6 | undercond_2.4: 0 |
| goesto_2.5: 2.19 | comesfrom_2.5: 2.6 | undercond_2.5: 0 |
| goesto_2.6: 2.24 | comesfrom_2.6: 2.12 | undercond_2.6: 2.47 |
| goesto_2.7: 2.24 | comesfrom_2.7: 2.19 | undercond_2.7: 2.48 |
| goesto_2.8: 2.24 | comesfrom_2.8: 2.13 | undercond_2.8: 2.49 |
| goesto_2.9: 2.2 | comesfrom_2.9: 2.24 | undercond_2.9: 0 |
| goesto_3.1: 3.5 | comesfrom_3.1: 3.1 | undercond_3.1: 0 |
| goesto_3.2: 3.6 | comesfrom_3.2: 3.5 | undercond_3.2: 3.41 |
| goesto_3.3: 3.8 | comesfrom_3.3: 3.5 | undercond_3.3: 3.42 |
| goesto_3.4: 3.15 | comesfrom_3.4: 3.5 | undercond_3.4: 3.43 |
| goesto_3.5: 3.2 | comesfrom_3.5: 3.6 | undercond_3.5: 0 |
| goesto_3.6: 3.2 | comesfrom_3.6: 3.8 | undercond_3.6: 0 |
| goesto_3.7: 3.2 | comesfrom_3.7: 3.15 | undercond_3.7: 0 |
| goesto_3.8: 3.2 | comesfrom_3.8: 3.5 | undercond_3.8: 3.40 |
| ... | ... | ... |
|  |  | condid_1.19: 8 |
|  |  | condid_1.30: 9 |
|  |  | condid_1.43: 10 |
|  |  | condid_1.70: 11 |
|  |  | condid_2.47: 5 |
|  |  | condid_2.48: 6 |
|  |  | condid_2.49: 7 |
|  |  | condid_3.40: 1 |
|  |  | condid_3.41: 2 |
|  |  | condid_3.42: 3 |
|  |  | condid_3.43: 4 |
|  |  | ... |

Fig. 9D – Dump of the resource properties hash. Excerpt of information gathered about links and link conditions between resources in subroutine `loadmap`.

```
0 : true:normal
1 : user.assessments[this./msu/smith/racecar.problem].status=solved:force
2 : user.assessments[this./msu/smith/racecar.problem].answer=friction:stop
3 : user.assessments[this./msu/smith/racecar.problem].answer=sliding:stop
4 : user.assessments[this./msu/smith/racecar.problem].answer=nonconstant:stop
5 : user.assessments[this./msu/korte/tests/part11.problem].status=solved:stop
6 : user.assessments[this./msu/korte/tests/part12.problem].status=solved:stop
7 : user.assessments[this./msu/korte/tests/part13.problem].status=solved:stop
8 : user.assessments[this./msu/korte/tests/pretest.problem].status=solved:stop
9 : user.assessments[this./msu/korte/tests/midterm.sequence].percent>60:stop
10 : user.assessments[this./msu/korte/tests/midterm.sequence].percent<10:force
11 : user.assessments[this./msu/korte/tests/final.sequence].percent>60:stop
...
```

Fig. 10 – Excerpt of the dump of the condition array constructed in procedure `loadmap`

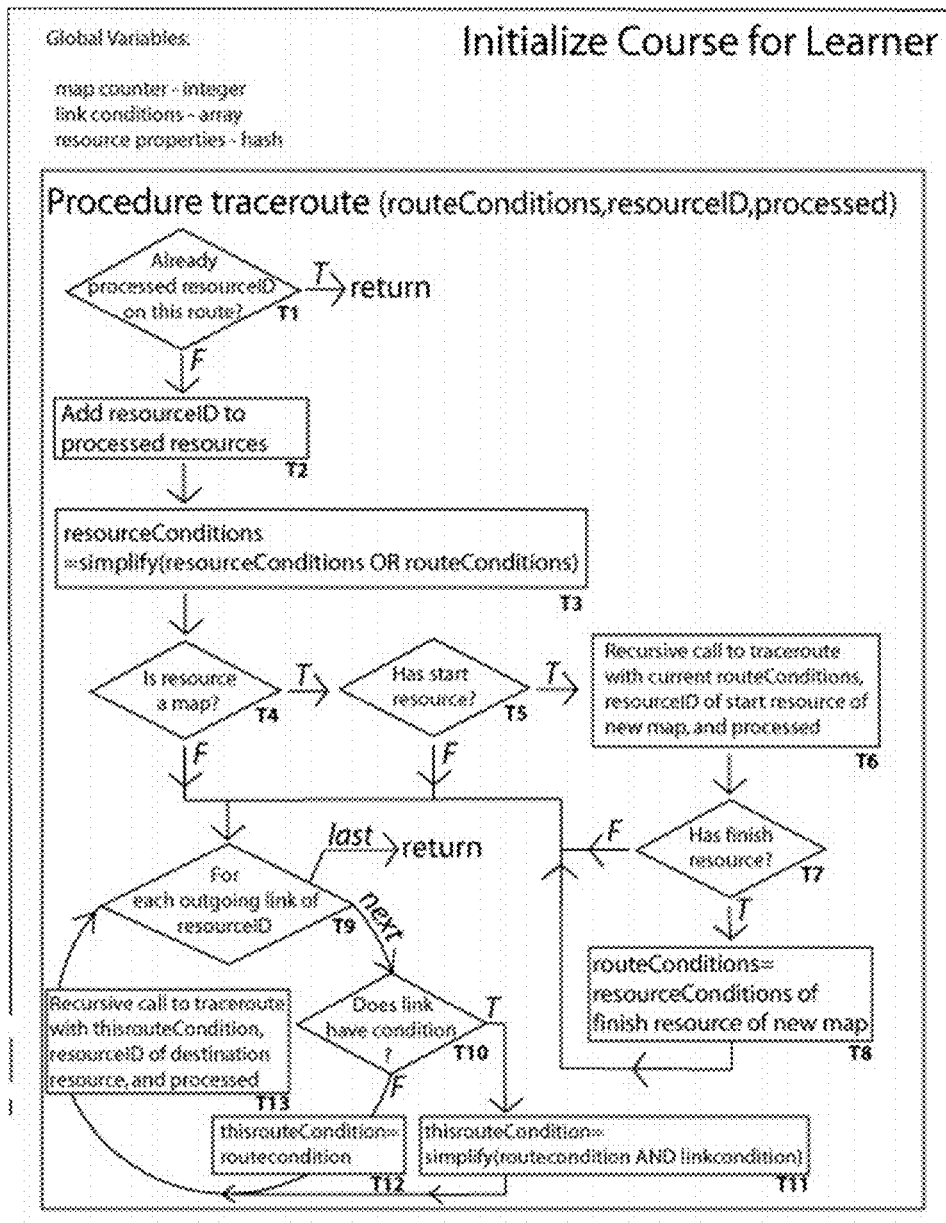
Fig. 11A – Flow chart of procedure `traceroute`

```
conditions_1.1: 0
conditions_1.11:
(((8&5&2)|(8&5&3)|(8&5&4)|(8&5&1))|((8&5&2)|(8&5&3)|(8&5&4)|(8&5&1)|(8&7&2)|(8&7&3)|(8&7
&4)|(8&7&1)))|((8&5&2)|(8&5&3)|(8&5&4)|(8&5&1)|(8&7&2)|(8&7&3)|(8&7&4)|(8&7&1)|(8&6&2)|(8
&6&3)|(8&6&4)|(8&6&1))
conditions_1.15:
((((8&5&2)|(8&5&3)|(8&5&4)|(8&5&1))|((8&5&2)|(8&5&3)|(8&5&4)|(8&5&1)|(8&7&2)|(8&7&3)|(8&7
&4)|(8&7&1)))|((8&5&2)|(8&5&3)|(8&5&4)|(8&5&1)|(8&7&2)|(8&7&3)|(8&7&4)|(8&7&1)|(8&6&2)|(8
&6&3)|(8&6&4)|(8&6&1)))&9
conditions_1.2:
(((((8&5&2)|(8&5&3)|(8&5&4)|(8&5&1))|((8&5&2)|(8&5&3)|(8&5&4)|(8&5&1)|(8&7&2)|(8&7&3)|(8&
7&4)|(8&7&1)))|((8&5&2)|(8&5&3)|(8&5&4)|(8&5&1)|(8&7&2)|(8&7&3)|(8&7&4)|(8&7&1)|(8&6&2)|(
8&6&3)|(8&6&4)|(8&6&1)))&9)&11
conditions_1.20: 0
conditions_1.29:
((((8&5&2)|(8&5&3)|(8&5&4)|(8&5&1))|((8&5&2)|(8&5&3)|(8&5&4)|(8&5&1)|(8&7&2)|(8&7&3)|(8&7
&4)|(8&7&1)))|((8&5&2)|(8&5&3)|(8&5&4)|(8&5&1)|(8&7&2)|(8&7&3)|(8&7&4)|(8&7&1)|(8&6&2)|(8
&6&3)|(8&6&4)|(8&6&1)))&9
conditions_1.36:
((((8&5&2)|(8&5&3)|(8&5&4)|(8&5&1))|((8&5&2)|(8&5&3)|(8&5&4)|(8&5&1)|(8&7&2)|(8&7&3)|(8&7
&4)|(8&7&1)))|((8&5&2)|(8&5&3)|(8&5&4)|(8&5&1)|(8&7&2)|(8&7&3)|(8&7&4)|(8&7&1)|(8&6&2)|(8
&6&3)|(8&6&4)|(8&6&1)))&10
conditions_1.5: 0
conditions_1.9: 8
conditions_2.1: 8
conditions_2.12: 8
conditions_2.13: 8
conditions_2.19: 8
conditions_2.2:
(((8&5&2)|(8&5&3)|(8&5&4)|(8&5&1))|((8&5&2)|(8&5&3)|(8&5&4)|(8&5&1)|(8&7&2)|(8&7&3)|(8&7
&4)|(8&7&1)))|((8&5&2)|(8&5&3)|(8&5&4)|(8&5&1)|(8&7&2)|(8&7&3)|(8&7&4)|(8&7&1)|(8&6&2)|(8
&6&3)|(8&6&4)|(8&6&1))
conditions_2.24: ((8&5)|(8&7)|(8&6))
conditions_2.5: 8
conditions_2.6: 8
conditions_3.1: ((8&5)|(8&7)|(8&6))
conditions_3.15: ((8&5&4)|(8&7&4)|(8&6&4))
conditions_3.2:
((8&5&2)|(8&5&3)|(8&5&4)|(8&5&1)|(8&7&2)|(8&7&3)|(8&7&4)|(8&7&1)|(8&6&2)|(8&6&3)|(8&6&4
)|(8&6&1))
conditions_3.5: ((8&5)|(8&7)|(8&6))
conditions_3.6: ((8&5&2)|(8&7&2)|(8&6&2))
conditions_3.8: ((8&5&3)|(8&7&3)|(8&6&3))
```

Fig. 11B – Dump of resource properties hash. Excerpt of cumulative link conditions to reach a certain resource.

SYSTEM AND METHOD FOR PREPARING AND DELIVERING INFORMATIONAL CONTENT

CROSS-REFERENCE TO RELATED APPLICATIONS

This application is a divisional of U.S. patent application Ser. No. 10/130,864 filed on Nov. 4, 2002. This application claims the benefit and priority of PCT/US00/24943, filed Sep. 12, 2000. This application claims the benefit of U.S. Provisional Application No. 60/167,887 filed Nov. 26, 1999. The entire disclosure of each of the above applications are incorporated herein by reference.

GOVERNMENT LICENSE RIGHTS

This invention was made with Government support under 9752985 awarded by The National Science Foundation. The Government has certain rights in the invention.

FIELD OF THE INVENTION

This invention relates to a system and method for interactive, adaptive, customized and individualized computer-assisted instruction of students, preferably implemented on network connected computers. More particularly, the system and method comprises i) an assembly tool for bringing diverse educational resources together to create customized course material for the instruction of students and ii) a replication element to update each resource and assure access to each updated resource. The system and method of the present invention responds to the instructor's creativity, allowing the instructor to shape and control the instructional materials and process.

BACKGROUND OF THE INVENTION

The application of computers in education has been limited by several problems, including a) a failure to provide systems that adapt to new advances in course material caused by technological developments, b) a failure to permit customized design of instructional information by the teacher, and c) a failure to integrate systems effectively into the existing curriculum.

Current approaches merely sequence students through prepackaged educational materials. These systems do not provide any means for gathering or using more comprehensive information from outside sources. Consequently, the educational materials are relatively static and outdated, resulting in course of limited to poor quality.

Computer assisted instruction systems have ignored or under-utilized such important developments in computer technology in recent years as client-server systems and networking systems. Though now an active field with a wide spectrum of activities from research to commercial applications, application of dynamic on-line systems in educational, instructional, and homework tasks is only just starting to be explored.

What is needed is a computer-driven system that adapts to new information, allows for new information to be readily utilized by an instructor, so that the instructor can integrate new information into the existing curriculum.

SUMMARY OF THE INVENTION

The present invention contemplates a system and method for computer-assisted education, comprising a Resource Assembly Tool (RAT) and a Dynamic Resource Replication (DRR) element. The RAT provides a graphical user interface inside of a standard web browser. The interface consists of a plurality (e.g. two or more) browser windows. In one embodiment, a first browser widow is configured as resizable with a frameset that contains the menu and the map under construction, and a second multipurpose non-resizable window that displays information and input forms. Once a new map is started, the author can then enlarge the map area and insert resources into it. These resources may be identified by URL or simple network browsing or searching metadata sources. Once resources have been located they are connected together using the link mode of the RAT.

Rather complex maps can be generated using the RAT. These are different from binary trees, both because branches can loop back, and because branches can be re-united. Additionally, maps that are not created by the RAT are accessible by the RAT with the resultant generation of a graphical layout of the map. The RAT then provides the integration of several maps, thus creating nested maps. A course can easily contain several hundred of these nested maps. Due to the inherent complexity of this arrangement all maps and conditions are compiled into a pre-processed binary data structure at the start of a session.

The delivery system for these resources consists of a distributed network of servers. While each author has a so-called home server which holds the authoritative copy of all resources published by that author, all servers in the network can host sessions utilizing these resources. DRR is designed to prevent overload situations on any one server in the network, as well as to avoid single points of failure in the network. Replication processes between servers in the network are triggered in two situations: i) a user wants to retrieve a resource from a server in the network which is not locally present on that server; ii) an author publishes a new version of a resource. In the first case, after localizing the author's home server and a series of authentication steps, the session-hosting server subscribes to the resource and replicates it to a local copy. In the latter case, all subscribed servers are notified that a new version is present, and according to a decision algorithm either replicate the new version or unsubscribe from it.

As the RAT allows an author to assemble resources from across the network into consistent presentations, the DRR mechanism was found to be capable of ensuring the integrity of such presentations even if parts of the network are down, inaccessible or overloaded. The dynamic nature of the DRR allows for just-in-time just-enough replication of resources and thus is different from caches, which are not updated when a resource changes, and static replication mechanisms implemented in many databases which only allow for non-discriminate replication of predefined chunks of data at prespecified times.

The characteristics of the DRR allow extremely large server networks to operate together without risk of a network failure. The selective replication capability of the DRR of the specific file requested by RAT limits the required memory, transmission time, and does not require the users computer to interact with the complete database of the Library server.

Thus, the present invention contemplates, in one embodiment, a method of combining educational resources, comprising: a) providing i) a network comprising a first home server of a first educational institution and a second home server of a second educational institution, said first home server hosting (i.e. holding in memory or in otherwise in a database) a first pool of resources, said second home server hosting to a second pool of resources, said resources comprising combinable fragments, pages, sequences and courses, ii) a first author at said first educational institution and a second author at said second educational institution, iii) a resource assembly tool configured for use by said first and second authors; and b) accessing a resource (e.g. a fragment, page, sequence, portion of a course, or entire course) from said second pool of resources through the actions of said first author; c) combining, through the use of said resource assembly tool by said first author, said resource from said second pool of resources with a resource (again, a fragment, page, sequence of pages, portion of a course, or entire course) from said first pool of resources. In a preferred embodiment, said accessing comprises replicating said resource from said second pool of resources.

It is not intended that the present invention be limited to the combination of resources "as is." The author has the freedom to make changes to the fragments, pages, sequences, courses and the like having educational content. For example, prior to said combining, the present invention contemplates that said first author modifies said resource of said second pool of resources (the original resource is not overwritten; rather a new version is created). On the other hand, prior to said combining, said first author may modify said resource of said first pool of resources. Of course, said first author may also choose to modify both resources before combining.

The present invention contemplates that, in one embodiment, said combining is part of the process for creating a first page, said page comprising combined resource fragments. It is not intended. however, that the present invention be limited to pages having only two fragments. In other words, the combining of first and second fragments may be preceeded—or followed—by combinations of other fragments. In some cases, the combining is the last step in the creation of a first author page.

It is also not intended that the combining only be at the fragment level. Resources can be combined to create entire courses. For example, a sequence of pages can be combined with another sequence to make a course.

As noted in more detail below, the present invention contemplates that said first author publishes said first author combination (e.g. page, sequence of pages, or course), thereby adding said first author combination to said first and second pools of resources. In other words, the product of the combining is made accessible to authors from other institutions, so that they may use the new product "as is" or as subsequently modified. For example, the first author page may be accessed by said second author and said second author, after said accessing, is free to modify said first author page so as to create a second author page.

It is not intended that the second author be limited to the nature or extent of modifications. The second author may choose to delete or edit material on the page. On the other hand, the second author may choose to add additional fragments, pages, etc. from one or more pools of resources. In any event, the present invention contemplates that said second author, after said accessing and modifying, publishes said second author combination (e.g. page or other resource), thereby adding said second author combination to said first and second pool of resources.

In other words, the sharing can continue because—whatever the second author does to the material—it is available to the first author for possible use, as well as any other authors that are part of the system via the network. Indeed, it is not intended that the number of institutions or authors be limited in any way. Instances where three or more institutions are involved are contemplated. For example, the present invention contemplates in one embodiment a method of combining educational resources, comprising: a) providing i) a network comprising a first home server of a first educational institution, a second home server of a second educational institution, and a third home server of a third educational institution, said first home server hosting a first pool of resources, said second home server hosting a second pool of resources, and said third home server hosting a third pool of resources, said resources comprising combinable fragments, pages, sequences of pages, and courses, ii) a first author at said first educational institution and a second author at said second educational institution, iii) a resource assembly tool configured for use by said first and second authors; and b) accessing, through the actions of said first author, i) a resource (e.g. fragment, page, etc.) from said second pool of resources and ii) a resource from said third pool of resources; c) combining, through the use of said resource assembly tool by said first author, said resource from said second pool of resources and said resource from said third pool of resources to create a first combination.

In the above-described embodiment, said first author is using and combining material from third-party sources. However, it is not intended that the present invention limit the author as to where resources can be obtained. Moreover, the author can combine in any manner desired. For example, the method can further comprise d) combining a resource (e.g. a fragment, page, etc.) from said first pool of resources with said first combination to create a second combination.

All of the above-described discussion about replicating as part of accessing can apply to the three (or more) institution embodiment. Similarly, the freedom to modify prior to combining should again be underscored. Most importantly, the present invention contemplates that said first author publishes said first author page, thereby adding said first author page to said first, second and third pools of resources, and thereby permitting access by other authors (who may make further changes and combinations to create a second author page).

A variety of system configurations can carry out the methods described above. In one embodiment, the present invention contemplates a system for sharing educational resources, comprising: a) a first author computer at a first educational institution connected to a first home server, said first author computer having a user interface, said first home server providing access to a first pool of resources comprising combinable resources (e.g. fragments, pages, sequences of pages, portions of courses, and entire courses); b) a second author computer at a second educational institution connected to a second home server, said second author computer having a user interface, said second home server providing access to a second pool of resources comprising combinable resources; c) a network connecting said first home server of said first educational institution to said second home server of said second educational institution; d) a resource assembly tool configured for use through said user interface of said first and second author computers, said resource assembly tool capable of combining said combinable resources from said first pool of resources and said second pool of resources; and e) a resource replication element configured so as to replicate resources from said first and second pools of resources prior to said combining of said resource assembly tool. Importantly, the systems are not limited to the number of servers or client computers.

DESCRIPTIONS OF THE DRAWINGS

FIG. 1 provides a top level schematic of the primary interfaces of the LearningOnline Network.

FIG. 2A shows the overview of network communication links between servers of the LearningOnline Network.

FIG. 2B shows an example of the Hosts Lookup Table.

FIG. 2C illustrates the response times of server-server communications without disk access.

FIG. 2D illustrates the response times of server-server communications with disk access.

FIG. 3A depicts the implementation of the Dynamic Resource Replication.

FIG. 3B describes the process of modifying a resource.

FIG. 4 shows a top level illustration of the Resource Assembly Tool.

FIG. 5A presents an embodiment of a graphical user interface during Resource Assembly Tool access.

FIG. 5B presents an example of the graphical user interface during Resource Assembly Tool access.

FIG. 5C presents another example of the graphical user interface during Resource Assembly Tool access.

FIG. 6 shows the non-graphical (XML) presentation of FIG. 5C.

FIG. 7A shows an example of a course map having nested sequences.

FIG. 7B shows an example of a course map sequence having nested pages.

FIG. 7C shows an example of a course map summary sequence.

FIG. 8 shows an example of a flow chart during a course initialization first run.

FIG. 9A illustrates an example of a flow chart during a course initialization first run for the procedure loadmap.

FIG. 9B demonstrates an example of a resource properties hash dump resulting from the loadmap procedure.

FIG. 9C demonstrates an example of a resource properties hash dump resulting from the links between resources from the loadmap procedure.

FIG. 9D demonstrates an example of a resource properties hash dump resulting from the links and link conditions between resources from the loadmap procedure.

FIG. 10 depicts an example of an excerpt of the dump of the condition array constructed in the loadmap procedure.

FIG. 11A illustrates an example of a flow chart during a course initialization first run for the procedure traceroute.

FIG. 11B depicts an example of an excerpt of the resource properties hash dump resulting from cumulative link conditions to reach a certain resource.

GENERAL DESCRIPTION OF THE INVENTION

Current computer-assisted instructional systems have only haphazardly exploited the potential of client-server systems and networking technologies. The present inventors recognize that systems, running under sophisticated windowing operating systems, can support advanced object based software applications, including high speed graphics, animation and audio output, that are particularly suited to education. Servers can store gigabytes of educationally relevant data and programs at central or distributed locations at quite reasonable cost.

Clients and servers can be linked remotely with increasing convenience and decreasing cost. The Internet has emerged as a means of providing an inexpensive means of connecting computers to provide effective communications and access to information and other resources such as software. Further Internet developments that made the Internet truly universal include the HTML and the HTTP protocols, which provide platform independent access to hyperlinked multimedia information, and the Java™ programming language, which provides platform independent software for Internet applications programming. Subsets of the Internet (called intranets) have become an increasingly important means for disseminating information and enabling communication within constrained domains, such as a single school system or corporate enterprise.

The present invention provides the tools for management and control over the computer-assisted instruction materials and provides the needed flexibility to allow an instructor to construct customized material using information from diverse educational resources. The present invention provides the tools for the integration of traditional educational material (such as data, equations and the like) from several sources. More importantly, the present invention permits an instructor to select from a wider and richer variety of educationally relevant sound and visual display objects. All elements of the on-screen display can be pulled from diverse sources and synthesized in an integrated display calling for graphics, animation, video, or sound as appropriate. The present invention provides the authoring tools needed to generate multimedia educational course material presentations that is accessible to the on-line student.

The elements of the display objects can be created by people other than the actual instructor (e.g. third-party teachers, artists, animators, singers and so forth). The instructor, through the tools of the present invention, has access to these materials and can utilize all or a portion of a third-party's course materials in the assembly of a customized on-line course, lecture, class, or session. The educational resources are stored in libraries (e.g. as data snips or dynamic clip art) and then accessed by the instructor in an implementation of this invention. These educational resources can be in the form of short clips of text, sound, voice, graphics, animation or video. Using the resource assembly tool of the present invention, these diverse resources can be combined according to the desires and creativity of the instructor to generate a customized presentation.

Another important object is that the method and system of this invention is adapted to implementation on a variety of networks. When so implemented, the interactive, adaptive, and self-paced computer-assisted instruction and homework provided by this invention is available to geographically dispersed students and from geographically dispersed schools.

The network on which this invention is implemented can be configured as an intranet. In another embodiment, implementation is achieved over the public Internet. In either case, the system is configured with appropriate links and is compatible with browser and e-mail format extensions. In short, this invention is adaptable to Network Computers ("NC"). NCs are low cost computers specifically designed to access intranets or the public Internet. In a current preferred embodiment and implementation, this invention is adaptable to multimedia PCs for some students or students with special needs. Typical interactive devices include keyboards, mice or other pointing devices, voice recognition, joy-sticks, touch activated devices, light-pens, and so forth. Other devices, such as virtual reality devices, can be added as they become commercialized.

Authoring instructional materials for a course, lecture, class or other type of educational presentation to a student, when done according to the method of the present invention, typically comprises several steps, including decisions about the objects to display to the student and the sequencing of these objects. The first step is the selection of objects which carry the education content for presentation to a student. Objects can include visual display items, such as text, animation or movies, audible display items, such as voice, audio and so forth. They can include input items known in the computer arts, such as buttons to select. Selections to chose from include (but are not limited to) the text to enter, the useful hypertext and hypermedia links, and functions to perform with student input and so forth. The second step is the selection of the sequencing logic for the ordered display of the objects to the student throughout the course, lecture, class or session.

Importantly, to increase the utility of the materials, the number of hard-coded hyperlinks between the resources should be minimized. The actual combining and sequencing is part of the system functionality and driven by RAT-constructed 'roadmaps', which are constructed by the instructors. With this mechanism, one and the same resource can be part of different courses in different contexts.

The present invention contemplates the use of algorithms in the design of the student interface virtual course resources. In one embodiment, the learner is provided with multiple representations of the same knowledge elements and can select a preferred representation. In a preferred embodiment, algorithms that learn from a learner's previous selection of preferred options are employed and these automatically customize the course to the learners' needs, offering remedial actions for detected shortcomings and allowing leaps over segments of material for which the student is predicted to already have achieved mastery.

The present invention contemplates an automated exam engine that will produce randomized and/or individualized tests without the instructor having the need or even the opportunity to select the problems. This can be done by providing a large pool of exam questions via an open source database. Each exam problem contains attached metadata that catalogs its degree of difficulty and discrimination for students of different ability levels.

Using the RAT, an instructor can create and/or assemble a customized set of assignments, quizzes, and examinations with a large variety of conceptual questions and quantitative problems. These on-line presentations can include pictures, animations, graphics, tables, links, etc. The writing and development is facilitated by numerous types of individualized problems designed to encourage students to collaborate and discuss concepts while insuring that problems differ for each student to inhibit rote copying.

Indeed, the present invention contemplates a feedback system i) where students and other instructors can comment, criticize, evaluate and/or grade a resource, and ii) where the author of the resource can comment, evaluate, grade and/or assist with performance of the student. With regard to the latter, in a preferred embodiment, students are given instant feedback and relevant hints via the Internet and may correct errors without penalty prior to an assignment's due date. The system keeps track of student's participation and performance, and records are available in real time both to the instructor and to the individual student. Statistical tools and graphical displays facilitate assessment and course administration.

This invention contemplates the ability of this student feedback system to be initiated by a screen button on the student's navigation graphical interface that opens up a text field. When the student sends a feedback, it arrives at an email address (or set of email addresses) specified by the course faculty; independent of the computer platform. With the normal 'reply' function, faculty or teaching assistants can respond to the student input and the reply automatically is returned by handling within the network. This type of student input improves the use of the on-line resources. For example, if additional specific hints are included in the reply by the instructor, these changes take effect within the network immediately and all students benefit.

Also contemplated by this invention is a chatroom that allows for multiple ways of communication. Learners can post text, graphics, whiteboard information and formulas into the chatroom, which operates without any plugins.

With regard to students and other instructors commenting and grading resources, the present invention contemplates compiling feedback of this type in an electronic file associated with the particular resource (whether the resource is a fragment, page, sequence of pages, portion of a course, or entire course). When the author of the resource (or another instructor) accesses the resource, the cumulative feedback associated with the particular resource (at that time) is available for review (e.g. the author or other instructor can query the feedback) so that comments and criticism can be considered in any effort to edit/modify the resource, thereby improving the resource. This process is an on-going process, allowing for the possibility of continuous improvement of the resource as it is experience by students or utilized by other instructors. By virtue of the feedback system, resources can be placed in competition. That is to say, students can apply a grade (or a set of grades directed to various features of a resource such as clarity, technical functionality, accuracy and the like) to a particular resource (e.g. a fragment, page, sequence of pages, portion of a course, or course) and that grade can be compared to the grade given to another resource in the same field (e.g. biology, math, etc.). If desired, the resource receiving the higher grade (or the higher average grade based on cumulative grading from a plurality of students) can thereafter be selected preferentially for instructional purposes.

Thus, the present invention also contemplates a method of evaluating educational resources, comprising: a) providing i) a network comprising a first home server of a first educational institution and a second home server of a second educational institution, said first home server hosting a first pool of resources, said second home server hosting a second pool of resources, said resources comprising combinable fragments, pages, sequences and courses, ii) a first author at said first educational institution and a second author at said second educational institution, iii) a resource assembly tool configured for use by said first and second authors; iv) one or more students connected through one or more computers to said network, said computers having a user interface; b) displaying a resource from said first pool of resources through the actions of a student on said user interface of said student's computer, to create a first displayed resource; c) grading said first displayed resource, whereby a numerical value associated with said first displayed resource is stored in a file; and d) accessing said first displayed resource (whether or not the resource is currently displayed or otherwise in use) through the actions of said first author, under conditions such that said numerical value associated with said first displayed resource is apparent to said author. Of course, the process need not stop here. In one embodiment, the present invention further contemplates, e) combining, through the use of said resource assembly tool by said first author, a resource from said first or second pool of resources with said displayed resource under conditions wherein said displayed resource is modified to create a modified first displayed resource; f) displaying said modified first displayed resource through the actions of a student on said user interface to create a second displayed resource; g) grading said second displayed resource, whereby a numerical value associated with said second displayed resource is stored in a file; and h) accessing said second displayed resource (whether or not the resource is currently displayed or otherwise in use) through the actions of said first author, under conditions such that said numerical value associated with said second displayed resource is apparent to said author. In some cases, the numerical value associated with the second displayed resource will be higher than the numerical value associated with the first displayed resource, indicating that [at least according to the student(s)] the resource has been improved. Again, the process need not stop here; indeed, the above indicated steps can be repeated numerous times (in the manner of a feedback loop).

The present invention is not limited to grading from students. The above-indicated method steps can be modified such that other instructors provide the feedback and the grading.

In addition, the present invention is not limited to grading and numerical values. The above-indicated method steps can be modified such that written comments or other symbols are provided as feedback in association with a resource.

Furthermore, the present invention is not limited to review of feedback and use of feedback by the original author. The above-indicated method steps can be modified such that a second author at another institution views the feedback and modifies the resource accordingly.

A. The Resource Assembly Tool

The RAT generates pathways that link resources. The RAT acts as a graphical user interface inside of a standard web browser. This invention contemplates that any browser-compatible software language will support RAT's function. The RAT/browers interface in one embodiment comprises two or more windows. For example, one window is resizable, and the other is a multipurpose non-resizable window. The former window contains the menu and the current project, while the latter window displays general operational information. When a new project is started the default settings are limited to start and finish codes, thus allowing the user complete freedom of choice for the resource links.

The project window operates in a similar manner as most popular computer operating systems. Editing is accomplished by using the mouse to click on the appropriate resource, or in the alternative, a dialog box allows use of describing the title of the resource for retrieval through the network. The dialog boxes also accept URL addresses that are either part of the institutions intranet or an external WWW URL. The invention contemplates an ability for the user to access a central database directory to search for and/or browse to locate desired resources.

The dialog box may also be utilized to delete resources from a linked pathway as well as adding them. It is envisioned that an option of a complete severance from the integrated pathway is coupled with an alternative options of merely removing the specific resource and leaving the pathway intact.

Once a desired resource is located, the link mode of the RAT is utilized. This function "physically" connects on resource to another that is the basis of the basic inventive concept of this system.

The default mode of the RAT is info mode. This allows the user to quickly pan the mouse over the presented pathway to examine the metadata of each resource. For example, if the mouse pointer is stopped over a movie resource, an information bubble will appear that presents the title, actors, subject matter, and running time. This will allow an instructor to quickly assess whether any particular pathway requires modification for a new course or due to changes within a specific academic field. If the instructor does require changes to the resource they only click on the resource and the RAT enters edit mode, thus allowing changes.

B. The Replication Element

To enable immediate and dynamic system reconfiguration in case of server or network downtimes and overload situations, data replication is required, where any machine in the network can serve any learner in the institution. On approach is to use a server network of inexpensive web servers running Linux® and the Apache web server, which communicate with each other via persistent TCP connections. The network of the present invention has the ability to replicate resources and update user records dynamically from server to server, as well as the ability to transfer user sessions between each other in overload situtations.

In order for the resource pool to be functionally more consistent and comprehensive, all resources in one embodiment take the form of a multimedia object and are stored in the multimedia resource pool. For each content author, the system will provide separate private construction and public resource space. Moving a resource from construction space into the public resource pool is combined with the 'wizard'-assisted gathering of abstracts, classification information and keywords (IMS compliant metadata and the Library of Congress classification scheme), as well as versioning and access privilege scheme.

C. Other System Elements

This invention contemplates the integration of the Computer-Assisted Personalized Approach (CAPA) with the other system elements in order to provide students with personalized problem sets, quizzes and exams. Different students see slightly different problems, which enables them to collaborate on a conceptual level without being able to blindly copy answers. Students are given instant feedback and relevant hints via the Internet and may correct errors without penalty until the assignment due date. The system records the students' participation and performance, and the records are available online to both the instructor and the individual student.

CAPA is a teaching tool, not a curriculum, and as such does not dictate course design, content or goals. Instead, it enables faculty to augment their courses with individualized relevant exercises. CAPA, as a stand-alone system has been widely accepted by more than 40,000 students in astronomy, biochemistry, chemistry, mathematics, physics, botany, accelerator physics, and a host of human ecology and computer science courses since 1992. CAPA has been licensed by various institutions for instruction in several disciplines.

This invention contemplates an integrated embodiment of CAPA with the LearningOnline Network (LON-CAPA). This linkage implements an infrastructure that allows a group of organizations (departments, universities, colleges, and commercial businesses) to link their on-line learning communities. LON-CAPA thus enables institutions to share their on-line learning objects and act as a common marketplace.

Most current on-line homework engines are close to faculty needs and desires but due to time and budget constraints they lack scalability and failover security. Systems that provide on-line homework are frequently subject to strong peak workloads close to deadlines, while at the same time their functionality is crucial.

The LON-CAPA is a distributed system with a classical three-tier architecture based on a communication backbone. The nodes in the network can be geographically distributed among different departments and even institutions with only the commodity Internet as link.

LON-CAPA is based on a network of basic computers as access servers and a few high-performance library servers. While library servers hold all objects (content and system) of a subset of users within the network anytime, access servers act as intelligent caches and replicate the needed resources at that point upon demand and update them as becomes necessary.

Definitions

The terms "instructional materials" or "educational materials" encompass all educational resources used as components of a course of instruction, or as components of a lecture, class, or other type of session with one or more students.

The terms "educational resource" or simply "resource" indicate an elementary piece or "fragment" of text, sound, voice, graphics, animation, and/or video (e.g. in the form of data snips or clip art) that can be combined, utilizing the Resource Assembly Tool (RAT) of the present invention, to represent a complete on-screen presentation (e.g. whether a single screen or "page of fragments" or whether a plurality of pages and links). With RAT, fragments can be combined into "pages" (i.e. something that a browser would display as a page or a printer would print as a page). Pages can be combined into sequences, and sequences into courses. Such components are selected according to the course (physics, math, biology, etc.) and can include prerequisite tests, pretests, lessons, and unit tests.

A "network" is the hardware and software connecting student client computers to school servers. "Network connections" can comprise fiber optic links, wired links or terrestrial or satellite wireless links. Servers are linked together on the network. There are "home" servers for each resource "author." A first resource author can, using the Resource Assembly Tool of the present invention, access a resource on his/her own home server; alternatively, a first resource author can also access a resource on a second resource author's home server.

Teachers and other instructional designers can create, or "author," materials for use in this invention (teachers are thus "authors"). Materials can be original or can be derived from existing textbooks, workbooks or media material. They can simply employ elements of standardized curricula, pretests such as criterion tests, post-tests, and standardized texts. However, the present invention is particularly suited to non-standardized curricula and the use of on-line educational resources authored by third-parties collaborating in a combined educational effort.

Parties collarborating in a combined educational effort can be from a variety of "educational institutions" including but not limited to public and private colleges and universities.

To encourage resource sharing and "re-usage" and to improve the quality of the educational resources, teachers and other instructional designers should be able to modify ("edit") the resources for their own use, or even be 'value adders'. Modifying and adding value to a resource allows all parties collaborating and contributing to the resource library to share and generate improved and enhanced instructional materials. It should be stressed that "modifying" is meant to indicate the creation of a new derivative resource of branch (while preserving the original resource in its original form). In other words, the modified resource does not override the a resource; rather it creates a new resource in the system which is derived from the orginal resource. In a preferred embodiment, a detailed log is kept with all branches of a resource specifying authorship history in machine-readable form.

Efficient re-usage of educational objects only works if those objects can actually be found in the potentially large pool of resources. The present invention contemplates that an instructor can "query" for an image with a graphical representation of particular information form a particular topic (e.g. trigonometry, calculus, etc.).

The present invention contemplates "personalized homework" or "individualized homework." This means that each student sees a slightly different computer-generated problem. This encourages collaboration between students on a conceptual level, but prevent blind copying of answers. The students get immediate automatic feedback for their entered homework answers, while faculty are able to provide answer-specific hints for common problems identified either beforehand or during the class term.

The term "httpd" is used to indicate Hypertext Transfer Protocol Daemon, a detached permanent server process that serves web content.

The term "GIF" refers to a Graphical Interface Format, a common format for INternet graphics developed by Compuserve.

DETAILED DESCRIPTION OF THE INVENTION

In one embodiment of the system and method of the present invention, the Network comprises of relatively inexpensive upper-PC-class server machines which are linked through the commodity interne in a load-balancing, dynamically content-replicating and failover-secure way. FIG. 1 schematically shows an overview of this network. All machines in the Network are connected with each other through two-way persistent TCP/IP connections. Clients (B, F, G and H in FIG. 1) connect to the servers via standard HTTP. There are two classes of servers, Library Servers (A and E in FIG. 1) and Access Servers (C, D, I and J in FIG. 1). Library Servers are used to store all personal records of a set of users, and are responsible for their initial authentication when a session is opened on any server in the Network. For Authors. Library Servers also host their construction area and the authoritative copy of the current and previous versions of every resource that was published by that author. Library servers can be used as backups to host sessions when all access servers in the Network are overloaded. Otherwise, for learners, access servers, are used to host the sessions. Library servers need to be strong on I/O, while access servers can generally be cheaper hardware. The network is designed so that the number of concurrent sessions can be increased over a wide range by simply adding additional Access Servers before having to add additional Library Servers. Preliminary tests showed that a Library Server could handle up to 10 Access Servers fully parallel.

The Network is divided into so-called domains, which are logical boundaries between participating institutions. These domains can be used to limit the flow of personal user information across the network, set access privileges and enforce royalty schemes.

Example of Transactions

FIG. 1 also depicts examples for several kinds of transactions conducted across the Network. An instructor at client B modifies and publishes a resource on her Home Server A. Server A has a record of all server machines currently subscribed to this resource, and replicates it to servers D and I. However, server D is currently offline, so the update notification gets buffered on A until D comes online again. Servers C and J are currently not subscribed to this resource. Learners F and G have open sessions on server I, and the new resource is immediately available to them. Learner H tries to connect to server I for a new session, however, the machine is not reachable, so he connects to another Access Server J instead. This server currently does not have all necessary resources locally present to host learner H, but subscribes to them and replicates them as they are accessed by H.

Learner H solves a problem on server J. Library Server E is H's Home Server, so this information gets forwarded to E, where the records of H are updated.

Transaction Mechanism

FIG. 2 elaborates on the details of this network infrastructure. FIG. 2A depicts three servers (A, B and C) and a client who has a session on server C. As C accesses different resources in the system, different handlers, which are incorporated as modules into the child processes of the web server software, process these requests.

Our current implementation uses mod_perl inside of the Apache web server software. As an example, server C currently has four active web server software child processes. The chain of handlers dealing with a certain resource is determined by both the server content resource area (see below) and the MIME type, which in turn is determined by the URL extension. For most URL structures, both an authentication handler and a content handler are registered.

Handlers use a common library lonnet to interact with both locally present temporary session data and data across the server network. For example, lonnet provides routines for finding the home server of a user, finding the server with the lowest load average (loadavg), sending simple command-reply sequences, and sending critical messages such as a homework completion, etc. For a non-critical message, the routines reply with a simple "connection lost" if the message could not be delivered. For critical messages, lonnet tries to reestablish connections and re-send the command. If no valid reply could be received, it answers "connection deferred" and stores the message in buffer space to be sent at a later point in time. Also, failed critical messages are logged.

The interface between lonnet and the Network is established by a multiplexed UNIX domain socket (denoted DS in FIG. 2A). The rationale behind this rather involved architecture is that httpd processes (Apache children) dynamically come and go on the timescale of minutes, based on workload and number of processed requests. Over the lifetime of an httpd child, however, it has to establish several hundred connections to several different servers in the Network.

On the other hand, establishing a TCP/IP connection is resource consuming for both ends of the line, and to optimize this connectivity between different servers, connections in the Network are designed to be persistent on the timescale of months, until either end is rebooted. This mechanism will be elaborated on below.

Establishing a connection to a UNIX domain socket is far less resource consuming than the establishing of a TCP/IP connection. lonc is a proxy daemon that forks off a child for every server in the Network. Which servers are members of the Network is determined by a lookup table, of which FIG. 2B is an example. In order, these entries denote: an internal name for the server, the domain of the server, the type of the server, the host name, and the IP address.

The lonc parent process maintains the population and listens for signals to restart or shutdown, as well as USR1. Every child establishes a multiplexed UNIX domain socket for its server and opens a TCP/IP connection to the lond daemon (discussed below) on the remote machine, which it keeps alive. If the connection is interrupted, the child dies, whereupon the parent makes several attempts to fork another child for that server.

When starting a new child (a new connection), first an init-sequence is carried out, which includes receiving the information from the remote lond which is needed to establish the 128-bit encryption key; the key is different for every connection. Next, any buffered (i.e., delayed) messages for the server are sent.

In normal operation, the child listens to the UNIX socket, forwards requests to the TCP connection, gets the reply from lond, and sends it back to the UNIX socket. Also, lonc takes care of the encryption and decryption of messages. lonc was built by putting a non-forking multiplexed UNIX domain socket server into a framework that forks a TCP/IP client for every remote lond.

lond is the remote end of the TCP/IP connection and acts as a remote command processor. It receives commands, executes them, and sends replies. In normal operation, a lonc child is constantly connected to a dedicated lond child on the remote server, and the same is true vice versa (two persistent connections per server combination).

lond listens to a TCP/IP port (denoted P in FIG. 2A) and forks off enough child processes to have one for each other server in the network plus two spare children. The parent process maintains the population and listens for signals to restart or shutdown. Client servers are authenticated by IP.

When a new client server comes on-line, lond sends a signal USR1 to lonc, whereupon lonc tries again to reestablish all lost connections, even if it had given up on them before a new client connecting could mean that that machine came on-line again after an interruption.

The gray boxes in FIG. 2A denote the entities involved in an example transaction of the Network. The Client is logged into server C, while server B is her Home Server. Server C can be an Access Server or a Library Server, while server B is a Library Server. Client submits a solution to a homework problem, which is processed by the appropriate handler for the MIME type "problem". Through lonnet, the handler writes information about this transaction to the local session data. To make a permanent log entry, lonnet establishes a connection to the UNIX domain socket for server B. lonc receives this command, encrypts it, and sends it through the persistent TCP/IP connection to the TCP/IP port of the remote lond. lond decrypts the command, executes it by writing to the permanent user data files of the client, and sends back a reply regarding the success of the operation. If the operation was unsuccessful, or the connection would have broken down, lonc would write the command into a FIFO buffer stack to be sent again later. lonc now sends a reply regarding the overall success of the operation to lonnet via the UNIX domain port, which is eventually received back by the handler.

Scalability and Performance Analysis

The scalability was tested in a test bed of servers between different physical network segments and FIG. 2B shows the network configuration of this test. In the first test, the simple ping command was used. The pinging command is used to test connections and yields the server short name as reply. In this scenario, lonc was expected to be the speed-determining step, since lond at the remote end does not need any disk access to reply. The graph in FIG. 2C shows the number of seconds until completion versus the number of processes issuing 10,000 ping commands each against one Library Server (a 450 MHz Pentium II was used in this test, with a single IDE HD). For the solid dots, the processes were concurrently started on the same Access Server and the time was measured until the processes finished—all processes finished at the same time. One Access Server, the 233 MHz Pentium II, can process about 150 pings per second, and as expected, the total time grows linearly with the number of pings.

The gray dots were taken with up to seven processes concurrently running on different machines and pinging the same server—the processes ran fully concurrent, and each process finished as if the other ones were not present (about 1000 pings per second). Execution was fully parallel.

In a second test, lond was the speed-determining step—10,000 put commands each were issued first from up to seven concurrent processes on the same machine, and then from up to seven processes on different machines. The put command requires data to be written to the permanent record of the user on the remote server.

In particular, one "put" request meant that the process on the Access Server would connect to the UNIX domain socket dedicated to the library server, lonc would take the data from there, shuffle it through the persistent TCP connection. lond on the remote library server would take the data, write to disk (both to a dbm-file and to a flat-text transaction history file), answer "ok", lonc would take that reply and send it to the domain socket, the process would read it from there and close the domain-socket connection.

The graph in FIG. 2D shows the results of the above test. Series 1 (solid black diamond) is the result of concurrent processes on the same server—all of these are handled by the same server-dedicated lond-child, which lets the total amount of time grow linearly. Series 2 through 8 were obtained from running the processes on different Access Servers against one Library Server, each series goes with one server. In this experiment, the processes did not finish at the same time, which most likely is due to disk-caching on the Library Server—lond-children whose datafile was (partly) in disk cache finished earlier. With seven processes from seven different servers, the operation took 255 seconds till the last process was finished for 70,000 put commands (270 per second)—versus 530 seconds if the processes ran on the same server (130 per second).

Server Content Resource Areas

Internally, all resources are identified primarily by their URL. Different logical areas of the server are distinguished by the beginning part of the URL:

/adm: publicly available content, logos, manual pages, etc.

/res/domainname/authorname/ . . . : the resource area, holding course maps, HTML pages, homework, movies, applets, etc. Access to these files is restricted by the cookie-based authentication mechanism. Content in this area will be served by type-dependent handlers, for example, one handlers to serve homework problems, and another one for TeX resources. The structure of this area of the server is exactly the same on every server, even though not all resources might be present everywhere.

/raw/domainname/authorname/ . . . : internally, this is just a symbolic link to the res directory, however, no content handlers are called when serving a resource and access is controlled by IP rather than cookies. This structure is used for replication of resources between servers.

/~authorname/ . . . : the content construction space. This is normal UNIX filespace, which however can only by viewed on the web by the authors themselves through the cookie-based authentication. Content handlers are active for this space. This space can be mounted on other UNIX machines, as well as AppleShare and Windows. Below the authorname, this directory has the same structure as the resource space of the author.

Publication of a Resource

Authors can only write-access the /~authorname/ space. They can copy resources into the resource area through the publication step, and move them back through a recover step. Authors do not have direct write-access to their resource space. During the publication step, several events will be triggered. Metadata is gathered, where a wizard manages default entries on a hierarchical per-directory base. The wizard imports the metadata (including access privileges and royalty information) from the most recent published resource in the current directory, and if that is not available, from the next directory above, etc. The Network keeps all previous versions of a resource and makes them available by an explicit version number, which is inserted between the file name and extension, for example foo.2.html, while the most recent version does not carry a version number (e.g., foo.html). Servers subscribing to a changed resource are notified that a new version is available.

Dynamic Resource Replication

Since resources are assembled into higher order resources simply by reference, in principle it would be sufficient to retrieve them from the respective Home Servers of the authors. However, there are several problems with this simple approach. Since the resource assembly mechanism is designed to facilitate content assembly from a large number of widely distributed sources, individual sessions would depend on a large number of machines and network connections to be available, and thus be rather fragile. Also, frequently accessed resources could potentially drive individual machines in the network into overload situations.

Finally, since most resources depend on content handlers on the Access Servers to be served to a client within the session context, the raw source would first have to be transferred across the Network from the respective Library Server to the Access Server, processed there, and then transferred on to the client.

To enable resource assembly in a reliable and scalable way, a dynamic resource replication scheme was developed. FIG. 3 shows the details of this mechanism. Anytime a resource out of the resource space is requested, a handler routine is called which in turn calls the replication routine (FIG. 3A). As a first step, this routine determines whether or not the resource is currently in replication transfer (FIG. 3A, Step D1a). During replication transfer, the incoming data is stored in a temporary file, and Step D1a checks for the presence of that file. If transfer of a resource is actively going on, the controlling handler receives an error message, waits for a few seconds, and then calls the replication routine again. If the resource is still in transfer, the client will receive the message "Service currently not available.".

In the next step (FIG. 3A, Step D1b), the replication routine checks if the URL is locally present. If it is, the replication routine returns "OK" to the controlling handler, which in turn passes the request on to the next handler in the chain.

If the resource is not locally present, the Home Server of the resource author (as extracted from the URL) is determined (FIG. 3A, Step D2). This is done by contacting all library servers in the author's domain (as determined from the Lookup Table, see FIG. 2B). In Step D2b, a query is sent to the remote server whether or not it is the Home Server of the author (in our current implementation, an additional cache is used to store already identified Home Servers (not shown in the figure)). In Step D2c, the remote server answers the query with "True" or "False". If the Home Server was found, the routine continues, otherwise it contacts the next server (Step D2a). If no server could be found, a "File not Found" error message is issued. In our current implementation, in this step the Home Server is also written into a cache for faster access if resources by the same author are needed again (not shown in the figure).

In Step D3a, the routine sends a subscribe command for the URL to the Home Server of the author. The Home Server first determines if the resource is present, and if the access privileges allow it to be copied to the requesting server (FIG. 3A, Step D3b). If this is true, the requesting server is added to the list of subscribed servers for that resource (Step D3c). The Home Server will reply with either "OK" or an error message, which is determined in Step D4. If the remote resource was not present, the error message "File not Found" will be passed on to the client. If the access was not allowed, the error message "Access Denied" is passed on. If the operation succeeded, the requesting server sends an HTTP request for the resource out of the /raw server content resource area of the Home Server.

The Home Server will then check if the requesting server is part of the network, and if it is subscribed to the resource (Step D5b). If it is, it will send the resource via HTTP to the requesting server without any processing by content handlers (Step D5c). The requesting server will store the incoming data in a temporary data file (Step D5a); the same file checked in Step D1. If the transfer is not completed, and appropriate error message is sent to the client (Step D6). Otherwise, the transferred temporary file is renamed as the actual resource, and the replication routine returns "OK" to the controlling handler (Step D7).

FIG. 3B depicts the process of modifying a resource. When an author publishes a new version of a resource, the Home Server will contact every server currently subscribed to the resource (FIG. 3B, Step U1), as determined from the list of subscribed servers for the resource generated in FIG. 3A, Step D3c. The subscribing servers will receive and acknowledge the update message (Step U1c). The update mechanism finishes when the last subscribed server has been contacted (messages to unreachable servers are buffered). Each subscribing server will check if the resource in question had been accessed recently, that is, within a configurable amount of time (Step U2).

If the resource had not been accessed recently, the local copy of the resource is deleted (Step U3a) and an unsubscribe command is sent to the Home Server (Step U3b). The Home Server will check if the server had indeed originally subscribed to the resource (Step U3c) and then delete the server from the list of subscribed servers for the resource (Step U3d). If the resource had been accessed recently, the modified resource will be copied over using the same mechanism as in Step D5a through D7 of FIG. 3A (FIG. 3B, Steps U4a through U6).

Construction of a Course by the Instructor
  Content Re-usage and Granularity
  Any faculty participating in the Network can publish their own learning resources into the common pool. To that end, the Network provides a "construction space" which is only accessible to the author, and a publication process, which transfers the material to the shared pool. During the publication process, metadata about the resource is gathered, and system-wide update notification and versioning mechanisms are triggered.

Learning resources can be simple paragraphs of text, movies, applets, individualizing homework problems, etc. In addition to providing a distributed digital library with mechanisms to store and catalog these resources, the Network enables faculty to combine and sequence these resources at several levels. An instructor from Community College A could combine a text paragraph from University B with a movie from College C and an online homework problem from Publisher D, to form one page. Another instructor from High School E can take that page from Community College A and combine it with other pages into a module, unit or chapter. Those in turn can be combined into whole coursepacks. Faculty can design their own curricula from existing and newly created resources instead of having to buy a complete off-the-shelf product.

FIG. 4 shows a general overview of the resource assembly mechanism and the different levels of content granularity supported by the current implementation of this principle. The topmost puzzle piece represents a resource at the fragment level—one image, one movie, one paragraph of text, one problem, or one regular web page. Attached to the resource is metadata gathered at the publication time of the resource.

Using the resource assembly tool described below, these fragments and pages can be assembled into a page. A page is a resource of the grain size which would be rendered as one page on the web and/or on the printer.

Using the same tool, fragments (which would then be rendered as stand-alone pages), pages, and sequences can be assembled into sequences. Sequences are resources which are rendered a sequence of pages, not necessarily linear. Examples are one lesson, one chapter, or one learning cycle.

On the third granularity level, fragments (rendered as stand-alone pages), pages, and sequences can be assembled into courses. Courses are a sequence which represents the entirety of the resources belonging to a learning unit into which learners can be enrolled. Examples are a University one-semester course, a workshop, or a High School class.
Maps
  To increase the utility of the materials, the number of hard-coded hyperlinks between the resources should be minimized. The actual combining and sequencing is part of the system functionality and driven by RAT-constructed "roadmaps", which are constructed by the instructors. With this mechanism, one and the same resource can be part of different courses in different contexts. The soft-linking makes it possible to import only the desired set of resources without effectively importing additional parts another instructors resources through hard-linked menus or "next page" buttons that might resided on those resources.
Curriculum Adaptivity
  Maps allow for conditional choices and branching points. The actual path through and presentation of the learning resources is determined by instructor-specified combinations of learner choices and system generated adaptations (for example, if the learner does not pass a test, additional resources may be included). Each learner can have an individualized curriculum according to preferences, capabilities and skills.

These maps can be generated at different levels of granularity with a graphical tool, or in an automated way through custom scripts.
Resource Assembly Tool
  The Network provides the Resource Assembly Tool as one means to generate maps. The Resource Assembly Tool provides a graphical user interface inside of a standard web browser. The current implementation is written in JavaScript™. FIG. 5 shows screenshots of the current implementation. The interface usually consists of two browser windows, one resizable one with a frameset that contains the menu and the map under construction, and a multipurpose non-resizable window that displays information and input forms. When a new map is started, it only has a start and a finish resources. The author can then enlarge the map area and insert resources into it.

In FIG. 5A, the author is editing information about a resource in the map after clicking on the box representing the resource in the map. In the dialog, the author can enter a map-internal title for the resource, which is displayed to the learners when navigating the maps. In the same dialog, the author will specify the URL of the resource, which can either be internal to the Network, or any URL of a web page outside of it. For internal resources, the author can also browse the Network filesystem or search the resource metadata to locate an appropriate resource.

The resource priority can be chosen. A resource can be "regular," "mandatory" or "optional." These resource priorities are only used in the bookkeeping of earned points by the learners. Within the map, resources of different priorities are displayed in different colors. The dialog also allows for two modes of removing the resource from the map: either deleting it from the map including every link to and from it, or deleting it while reconnecting any links that went through the resource. As an example, resources A and B might both connect to resource C, and resource C might connect to D. When removing C from the map using the first option, both A and B will not no longer be connected to D. Using the second option, both A and B will reconnect with D. In the latter case, the Resource Assembly Tool will also handle conditional links correctly: such as, if A connected to C under condition 1, and C connected to D under condition 2, then in the end A will connect to D under a new condition which is (1 AND 2).

Finally, this dialog allows the author to connect the resource to another resource (or itself) through a new link. When selecting this option, the Resource Assembly Tool goes into link mode, and will link the current resource to the next clicked resource (unless the action is cancelled).

FIG. 5B shows the Resource Assembly Tool in info mode, that is, when no specific component of the map is edited, and if the Tool is not in link mode. In info mode, the contents of the dialog window change dynamically as the mouse is moved over the components of the map. In this case, the mouse pointer is over the link condition between two resources. The dialog window shows the titles of the connected resources, as well as the condition priority. In this scenario, the condition priority is set such that the link cannot be taken (i.e., "is blocked") if the condition is false. The condition priority can also be set such that the link is recommended if the condition is true (possibly giving the learner several options where to go next), or that the link must be taken ("is forced") over any other possible link if the condition is true. Within the map, conditions of different priorities are displayed in different colors. If the author now were to click on the condition, the Tool would go into edit mode, and the condition could be edited.

FIG. 5C shows the Tool in edit mode for the link between the resource titles displayed. The author can remove the link, or insert a new resource into the link. Obviously, by this mechanism, rather complex maps can be generated. These are different from binary trees, both because branches can loop back, and because branches can be re-united. In fact, most branches re-unite in the finish resources. Into each link, a condition with one of three different priorities can be attached. Whether or not a certain resource in the map can be displayed depends on whether or not it can be reached through any path along allowed links, starting with the start resource of the course. If a resource is not linked to, it is assumed to be accessible if the map which it is part of is accessible.

Map Representation and Storage Format

FIG. 6 shows the XML representation of the resource map constructed in FIG. 5, which is the format in which maps are stored. In the figure, however, additional graphical map layout information generated by the Resource Assembly Tool is not displayed. This graphical information is optional to re-generate the same graphical layout when the map is brought up again in the Resource Assembly Tool, and is not needed for any other system functionality.

Maps can be generated by tools other than the Resource Assembly Tool. In particular, an author might have some other representation of a course sequence, which can be converted into a map using scripts. If this map then were to be brought up in the Resource Assembly Tool, the Tool would automatically generate a graphical layout for it. Each entry of the map, resources, conditions and links, are stored in separate tags.

Resources and conditions have to have unique ID numbers. These numbers are automatically generated by the Resource Assembly Tool when the entry is first created, or added to the entries when a map generated outside the Resource Assembly Tool is first retrieved. They can also be assigned by custom scripts or added in by hand.

In this example, FIG. 6, entry 1 is the start resource of the map. When this map is accessed, the source (src) URL of this tag will be the first resource rendered. Entry 2 is the finish resource of this map. This resource will be the last resource in the sequence of resources. Entry 6 is a problem resource with the given URL and title, as well as the priority "mandatory". Entry 19 is a condition, which is used by the link between entries 6, the problem, and 9, a sequence.

Example of Nested Maps

FIG. 7 shows the XML representation of three maps which are imported into each other. FIG. 7B is the sequence that is referenced as resource 9 in the course map FIG. 7A. In the resulting map, the entry point of resource 9 in FIG. 7A is in fact the entry point of the start resource of FIG. 7B, namely, resource 1. The exit point of resource 9 in FIG. 7A is the exit point of the finish resource of FIG. 7B, namely, resource 2. FIG. 7C is the page which is referenced as resource 24 in FIG. 7B.

A course can easily contain several hundreds of these nested maps. Since the accessibility of each individual resource in the course depends on the state of all possible paths linking it to the start resource of the course across all intermediate maps, the computation and disk-I/O effort per single transaction could quickly become prohibitive. Thus, all maps and conditions are compiled into a pre-processed binary data structure at the start of a session.

Initialization of a Course for a Learner

When a learner first enters a course during a session, the system will initialize this course for the learner. In particular, at this point, the course map and all nested (embedded) maps and resources are evaluated, and the information is compiled into two binary structures, which are stored with the session information: the resource properties hash, and the link conditions array. This information will be used over the duration of the session for several purposes: navigation (which resource is the next, which one the previous?), for access control (can the resource be reached under the link conditions given the current state of the student?), and to register assessment results within the context of a certain course and map (there might be several instances of the same problem resource within a course).

Evaluation of the Map Structure for a Course

The URL of the course is passed to the procedure readmap (FIG. 8). Procedure readmap first initializes the resource properties as an empty hash, seeds the link conditions array with a 0th element, which is set to "true", priority "normal", and sets the map counter to 0 (FIG. 8, Step R1). While the resource properties hash, the link conditions array and the map counter are global variable of the initialization process, all other variables are local to the procedures (an important property for these routines to run recursively). The procedure readmap then calls procedure loadmap for the URL of the course (FIG. 8. Step R2).

FIGS. 9 & 10 show a dump of excerpts of the binary structure generated in loadmap for the nested maps of FIG. 7. Procedure loadmap (FIG. 9A) first checks if the map URL has already been processed (multiple inclusion of the same map in a course structure) (FIG. 9A, Step L1). If the URL was processed, it has been assigned a map counter value in the resource properties hash. If the map has been processed, there is no need to process it again, and loadmap returns.

If the map has not been processed, the map counter is incremented and the map is registered under the current value in the resource properties hash (FIG. 9A, Step L2). The file is then opened (FIG. 9A, Step L3), which might entail prior replication, and the contents are parsed. If there are no further entries, loadmap returns (FIG. 9A. Step L4).

The new entry tag is then read (FIG. 9A. Step L5) and the type is determined (FIG. 9A, Step L6). If the entry is a resource (Step L7), a resource ID is formed by combining the map counter and the resource ID within the map. For example, the "Part 1 Introduction" resource of part1.sequence (FIG. 7B) was assigned the resource ID 2.5, since it has the internal resource ID 5 in the $2^{nd}$ map processed (see FIG. 9B under "ids_"). If the same URL is found again, additional IDs are assigned to it. It is necessary to store the IDs under the URL in the resource properties hash for reverse lookup if a user simply requests a URL. If the resource is a start or finish resource, the resource ID is registered as the start or finish resource of the map, respectively (FIG. 9B. "map—start". "map_finish"). The properties of the resource (URL, Title, Priority, etc) are now stored under the resource ID (see for example FIG. 9B "title_2.5").

If the resource is not a map itself (FIG. 9A, Step L8), the next entry is read. Otherwise, procedure loadmap calls itself recursively to process that map (Step L9). If in Step L6, the type of the entry was determined to be a condition. a condition ID is formed (Step L10) by again combining the map counter with the internal ID. The condition is also added to the end of the condition array (see FIG. 10), which is a compilation of all conditions in the course (Step L11). The conditions in this array are evaluated when a transaction occurs that could change the state of the student, and the state of each condition is stored by the index number in the session environment. A reference to the index number in the condition array is stored under the condition ID (FIG. 9D. "condid_").

If the entry is a link (Step L6), a link ID is generated (Step L121. This ID is formed by combining the map counter and another counter which is incremented for every new link within the map. Under this ID, the IDs of the originating and the destination resource of the link are stored, as well as that of the link condition (FIG. 9D). For the originating resource, in Step L13 the link ID is added to the list of outgoing links (FIG. 9C, "to_"), and for the destination resource, the link ID is added to the list of incoming links (FIG. 9C, "from_").

After the last entry has been processed, procedure loadmap returns. After the last map has been processed, the original course-level instance of loadmap returns to readmap (FIG. 8, Step R2). The next major step will be to determine all possible paths and conditions leading up to a resource for access control.

readmap checks if the course has a start resource from its map_start entry in the resource properties (Step R2), and if does not, continue to store the two global binary data structures (Steps R5, R6). In this special case, all resources which are part of any maps in the course are assumed to be accessible.

If the course has a start resource, readmap calls the procedure traceroute (FIG. 11A) with the following parameters (Step R4); 1) the cumulative condition along this path or route so far is set to "true" (the map is accessible). 2) the resource ID of the start resource of the course map, and 3) an empty list for all resources processed so far along this route. It is again important to note that all variables except the global binary structures are local to traceroute, since traceroute will recursively call itself whenever there is a branching to follow all possible paths of the maps.

traceroute will establish a section within the resource properties hash that builds up all conditions leading up to a resource. FIG. 11B shows an excerpt of the final result. For example, resource 2.5, the introduction to part 1, can be reached under condition 8 (see FIG. 10), meaning, after solving the pretest problem. traceroute first checks if the resource has already been processed on this route by its resource ID (FIG. 11A. Step T1). This test avoids that traceroute runs into endless loops when the links on the map loop. Next, the resource ID is added to the list of processed resources on this route (Step T2).

The resource conditions are now OR'd (i.e. a logical "or" is applied) with the cumulative conditions on this route (Step T3)—the route represents another way of getting to the resource. A small routine with simplification rules for boolean expressions is called to simplify the potentially very long expression.

In the next step, it is determined if the resource is itself a map (Step T4). If it is, the exit route conditions can differ from the entry route condition by all additional conditions along the paths in the embedded maps (for non-map resources, entry and exit route conditions are the same). If, however, the embedded map does not have a start resource (Step T5), that is not the case—again, the missing of entry point to an embedded link structure is interpreted as the resources being openly accessible.

If the embedded map does have a start resource. traceroute is called recursively with the current route conditions, the ID of the start resource of that map, and the list of already processed resource IDs (Step T6). Upon return, if the embedded map does not have a finish resource, the entry and exit conditions of this map are assumed to be the same (Step T7). If the map had a finish resource, the route condition so far is set to the resource condition of the finish resource of the embedded map (Step T8). In order go on from here, the user would have had to reach the finish resource of the embedded map.

Now the route conditions are correctly set for exiting the resource and going on from here. traceroute now loops over all outgoing links of the resource (Step T9). If the link does have a link condition (Step T10), then the route condition for this branch path is the cumulative route condition so far AND the link condition (Step T1 I). If there is no link condition, then there is no change in route conditions (Step T12). To further process the routes along this link, traceroute is called recursively with the resource ID of the destination resource of the link, the new route conditions, and the list of already processed resources (Step T13). traceroute returns after processing the last outgoing link of the resource it had been called.

FIG. 11B shows part of the output of traceroute for the example FIG. 7.

Multivalued Boolean Evaluation of Link Priorities

When a user accessed a resource on a map and desires to access the "next" resource, the request is processed by a number of steps. From the data exemplified in FIG. 9C, it is determined which outgoing links exist. From the data in FIG. 9D it is determined to which resources those links lead. For each of the resources, the expressions in FIG. 11A are evaluated as follows. Stored in the session environment is the evaluation of the table FIG. 10, where the boolean part is evaluated as "0" or "1". In addition, a multivalued boolean value is computed incorporating the condition priority. A false blocking condition is assigned the value zero, all other false conditions the value 1. A true forced condition is assigned the value 3, all other true conditions the value 2.

In the expressions FIG. 11A an "&" ("AND") is processed as the minimum (min) operation, a "l" ("OR") is processed as the maximum (max) operation. The outcome "0" means "blocked", the outcome "1" means "not recommended", the outcome "2" means recommended, and the outcome "3" means forced.

From the above, it should be clear that the methods and systems of the present invention provide computer-driven system that adapts to new information, allows for new information to be readily utilized by instructors, so that the instructor can integrate new information into the existing curriculum.

We claim:

1. A computer-implemented apparatus for electronically preparing and delivering informational content, comprising:
    a networked computer and a first memory connected to said networked computer;
    a resource assembly tool computer and a second memory connected to said resource assembly tool computer;
    the first and second memories storing instructions that, when executed respectively by the networked computer and the resource assembly tool computer, cause the networked computer and resource assembly tool computer to perform the steps of:
    said networked computer storing at least one resource and storing in association with said at least one resource a first electronic file reflecting information captured from users of content containing said at least one resource;
    said resource assembly tool computer accessing said networked computer and displaying information about said at least one resource, including said information captured from users stored in said first electronic file;
    said resource assembly tool computer assembling first level of content granularity by defining and storing in said second memory a map data structure to which said at least one resource and other resources are associated to define the first level of content granularity, the first level of content granularity having a second electronic file reflecting information captured from users of said first level of content granularity;
    the resource assembly tool computer publishing the assembled first level of content granularity by disseminating a copy to said second memory for storage in such fashion that said first electronic file remains associated with said one resource and said second electronic file remains associated with said first level of content granularity in the disseminated copy;
    the networked computer capturing user information related to the use of the first level of content granularity and of the one resource and storing in said first memory such captured user information in said respective first and second electronic files;
    the networked computer evaluating said informational content according to three different predefined information types, namely: (a) resource type; (b) condition type; and (c) link type;
    the networked computer testing for the resource type and upon detection to recursively load additional informational content if the informational content comprises a nested map data structure;
    the networked computer testing for the condition type and upon detection storing the informational content as a condition associated with a link; and
    the networked computer testing for the link type and upon detection registering the informational content as property of at least one originating resource and at least one destination resource.

2. The system of claim 1 wherein the networked computer and the resource assembly tool computer are coupled via a computer network and are programmed to cooperate to propagate captured user information stored in said second electronic file back to the resource assembly tool computer to be displayed by the resource assembly tool computer.

3. The system of claim 1 wherein the resource assembly tool computer updates information stored in at least one of said first and second electronic files based on instructor selection in the assembly of first level of content granularity.

4. The system of claim 1 further comprising a third computer communicating with said networked computer to receive a copy of said map data structure reflecting said first level of content granularity.

5. The system of claim 4 wherein said map data structure reflects said at least one resource as a component of said first level of content granularity.

6. The system of claim 4 wherein said third computer captures said information captured from users of content containing said at least one resource and stores said captured information in said copy of said map data structure.

7. The system of claim 6 wherein said third computer communicates said information captured from users by permitting said copy of said map data structure to be communicated to the networked computer.

8. The system of claim 1 wherein the networked computer has memory configured to store files using a map data structure defining second level of content granularity nested within first level of content granularity.

9. The system of claim 1 wherein the networked computer has memory configured to store files using a map data structure defining second level of content granularity nested within first level of content granularity and defining conditional branch points whereby the second level of content granularity is only conditionally presented based on user interaction.

10. The system of claim 1 wherein the networked computer has memory configured to store files using a map data structure that causes storing of resources in association with different resource priority levels, including but not limited to the following levels: (a) regular priority, (b) mandatory priority and (c) optional priority.

11. The system of claim 1 wherein the networked computer has memory configured to store files using a map data structure that organizes informational content according to one of at least three predefined types, namely:
    (a) resource type;
    (b) condition type; and
    (c) link type.

12. The system of claim 1 further configured to initialize and deliver a course to a learner, wherein the networked computer is programmed to evaluate the first level of content granularity and to compile the first level of content granularity, including any embedded second level of content granularity, into at least one binary structure at the time a course is initialized for said learner.

13. The system of claim 1 wherein the networked computer uses information stored in at least one of said first and second electronic files to conditionally recommend resources to a learner.

14. The system of claim 1 wherein the resource assembly tool computer is an instructor computer terminal of an educational institution network and said networked computer is a computer of the educational institution network, and further wherein the educational institution network comprises multiple instructor terminals comprising resource assembly tool computers, each instructor terminal coupled to the networked computer for shared access to the at least one resource and first electronic file.

15. The system of claim 14 wherein the networked computer is further coupled to a remote networked computer, and further programmed to access a second resource from said remote networked computer and provide the second resource upon request to the resource assembly computer.

16. The system of claim 1 wherein the at least one resource is a component of a course, and the resource assembly tool computer is further programmed to allow a course instructor to access resources from the networked computer, assemble the resources into a course, and publish the course to one or more learners; wherein the user information captured by the networked computer relates to said learners.

17. The system of claim 16 wherein one of the networked computer and the resource assembly tool computer is further programmed to access the user information and to generate and display to the course instructor a predictor of learner performance in regard to a second resource stored on the networked computer.

18. The system of claim 1 wherein the resource assembly tool computer is coupled to computers of learners through a network common to the resource assembly tool computer and networked computer, and is further programmed to provide a feedback system permitting an instructor to comment, evaluate, grade, and assist with learner performance in relation to the at least one resource.

19. The system of claim 18 wherein the networked computer is further programmed to capture information concerning learner participation in and performance on the at least one resource, and provides such captured information to the resource assembly tool computer; and wherein the resource assembly tool computer is further programmed to display such captured information to the instructor.

20. The system of claim 1 wherein the networked computer is further programmed to compile at least one of instructor feedback and learner feedback relating to the at least one resource and store such feedback in an electronic file associated with the resource, and to provide access to such electronic file to a user of the resource assembly tool computer and at least one additional user of a computer within a network common to the resource assembly tool computer and networked computer; and wherein the resource assembly tool computer and the at least one additional computer are programmed to allow such users to view the feedback and edit or modify the resource based upon the feedback.

* * * * *